United States Patent
Cui

(10) Patent No.: US 11,438,893 B2
(45) Date of Patent: Sep. 6, 2022

(54) APPARATUS AND METHOD IN WIRELESS COMMUNICATION SYSTEM, AND COMPUTER-READABLE STORAGE MEDIUM

(71) Applicant: Sony Corporation, Tokyo (JP)

(72) Inventor: Tao Cui, Beijing (CN)

(73) Assignee: SONY CORPORATION, Tokyo (JP)

(*) Notice: Subject to any disclaimer, the term of this patent is extended or adjusted under 35 U.S.C. 154(b) by 247 days.

(21) Appl. No.: 16/648,240

(22) PCT Filed: Nov. 15, 2018

(86) PCT No.: PCT/CN2018/115643
§ 371 (c)(1),
(2) Date: Mar. 18, 2020

(87) PCT Pub. No.: WO2019/096206
PCT Pub. Date: May 23, 2019

(65) Prior Publication Data
US 2020/0236677 A1 Jul. 23, 2020

(30) Foreign Application Priority Data
Nov. 17, 2017 (CN) .......................... 201711147226.4

(51) Int. Cl.
*H04W 72/04* (2009.01)
*H04W 72/12* (2009.01)
(Continued)

(52) U.S. Cl.
CPC ....... *H04W 72/0453* (2013.01); *H04W 16/14* (2013.01); *H04W 24/02* (2013.01);
(Continued)

(58) Field of Classification Search
None
See application file for complete search history.

(56) References Cited

U.S. PATENT DOCUMENTS 11,218,280 B2 * 1/2022 Futaki ................. H04W 56/001
2019/0036673 A1 * 1/2019 Chen ...................... H04L 5/001
(Continued)

FOREIGN PATENT DOCUMENTS

CN       102255685 A    11/2011
CN       102845009 A    12/2012
(Continued)

OTHER PUBLICATIONS

International Search Report and Written Opinion dated Jan. 30, 2019 for PCT/CN2018/115643 filed on Nov. 15, 2018, 8 pages including English Translation of the International Search Report.

*Primary Examiner* — Saba Tsegaye
(74) *Attorney, Agent, or Firm* — Xsensus LLP

(57) ABSTRACT

An apparatus in a wireless communication system comprises a processing circuit configured to: determine a channel detection mode for an unlicensed frequency band on the basis of at least a wireless communication service type and/or a cell load condition; and generate configuration information comprising a channel detection mode, the configuration information needing to be sent to user equipment so as to indicate the channel detection mode to the user equipment. According to at least one aspect of the embodiments of the present disclosure, a channel detection mode suitable for a current application scenario is configured for a large-bandwidth unlicensed frequency band in a 5G new radio (NR) on the basis of at least a wireless communication service type and/or a cell load condition, which may reduce the workload of a base station and user equipment and increase system working efficiency while improving bandwidth allocation efficiency and resource utilization.

18 Claims, 16 Drawing Sheets

(51) Int. Cl.
*H04W 16/14* (2009.01)
*H04W 24/02* (2009.01)

(52) U.S. Cl.
CPC ..... *H04W 72/042* (2013.01); *H04W 72/1268* (2013.01); *H04W 72/1284* (2013.01)

(56) References Cited

U.S. PATENT DOCUMENTS

| | | | |
|---|---|---|---|
| 2019/0103954 A1* | 4/2019 | Lee | H04W 48/12 |
| 2019/0104543 A1* | 4/2019 | Park | H04W 74/006 |
| 2019/0150172 A1* | 5/2019 | Ang | H04W 72/1231 |
| | | | 370/329 |
| 2021/0167930 A1* | 6/2021 | Jeon | H04W 76/28 |

FOREIGN PATENT DOCUMENTS

| | | |
|---|---|---|
| CN | 104717687 A | 6/2015 |
| CN | 105101283 A | 11/2015 |
| WO | 2017/133612 A1 | 8/2017 |

* cited by examiner

APPARATUS AND METHOD IN WIRELESS COMMUNICATION SYSTEM, AND COMPUTER-READABLE STORAGE MEDIUM

CROSS-REFERENCE TO RELATED APPLICATIONS

The present application is based on PCT filing PCT/CN2018/115643, filed Nov. 15, 2018, which claims priority to Chinese Patent Application No. 201711147226.4, filed Nov. 17, 2017 with the Chinese Patent Office, each of which is incorporated herein by reference in its entirety.

FIELD

The present disclosure generally relates to the technical field of wireless communications, and in particular to a device and a method in a wireless communication system, as well as a computer readable storage medium, for performing and optimizing channel detection on an unlicensed band and related configurations in the fifth generation mobile communication (5G) new radio (NR) technology.

BACKGROUND

With reference to the contents regarding a relatively wide bandwidth on a licensed band in the 5G NR standard that is under discussion these days, from a perspective of a physical layer, a NR carrier may be configured with a maximum bandwidth of 400 MHZ, which is increased by at least 20 times when compared with a maximum bandwidth of 20 MHZ of a sub-carrier in the LTE system. Therefore, for an unlicensed band with a large bandwidth in NR, in order to reduce the processing load and complexity of a base station or a user equipment in detecting whether a channel on a certain band is idle, and to improve flexibility of resource scheduling and resource utilization efficiency under such a large bandwidth, the conventional channel detection process and configurations on an unlicensed band in the LTE system are required to be improved.

SUMMARY

Brief summary of the present disclosure is given hereinafter, so as to provide basic understanding in some aspects of the present disclosure. However, it is to be understood that this summary is not an exhaustive overview of the present disclosure. It is neither intended to identify key or critical parts of the present disclosure, nor intended to define the scope of the present disclosure. It merely functions to present some concepts of the present disclosure in a simplified form to be used as a prelude to a more detailed description stated later.

In view of the problem(s) as described above, an object of at least one aspect of the present disclosure is to provide a device and a method in a wireless communication system, and a computer readable storage medium, with which channel detection on an unlicensed band in 5G NR and related configurations can be performed and optimized, thereby reducing a processing load of a base station and a user equipment while improving bandwidth allocation efficiency and resource utilization efficiency, thus improving system operation efficiency.

According to an aspect of the present disclosure, there is provided a device in a wireless communication system. The device includes processing circuitry configured to: determine, based on at least a radio communication service type and/or a cell load condition, a channel detection manner for an unlicensed band; and generate configuration information including the channel detection manner, the configuration information being sent to a user equipment to indicate the channel detection manner to the user equipment.

According to another aspect of the present disclosure, there is also provided a device in a wireless communication system. The device includes processing circuitry configured to: determine a channel detection manner for an unlicensed band according to configuration information including the channel detection manner from a base station; and perform channel detection on the unlicensed band based on the determined channel detection manner. The channel detection manner is determined by the base station based on at least a radio communication service type and/or a cell load condition.

According to yet another aspect of the present disclosure, there is also provided a method in a wireless communication system. The method includes: determining, based on at least a radio communication service type and/or a cell load condition, a channel detection manner for an unlicensed band; and generating configuration information including the channel detection manner, the configuration information being sent to a user equipment to indicate the channel detection manner to the user equipment.

According to still another aspect of the present disclosure, there is also provided a method in a wireless communication system. The method includes: determining a channel detection manner for an unlicensed band according to configuration information including the channel detection manner from a base station; and performing channel detection on the unlicensed band based on the determined channel detection manner. The channel detection manner is determined by the base station based on at least a radio communication service type and/or a cell load condition.

According to still another aspect of the present disclosure, there is also provided a computer readable storage medium storing executable instructions. The executable instructions, when being executed by a computer, cause the computer to perform the above method(s) in the wireless communication system.

According to other aspects of the present disclosure, there are also provided computer program codes and a computer program product for implementing the above-described method(s) according to the present disclosure.

According to at least one aspect of the embodiments of the present disclosure, for an unlicensed band with a large bandwidth in 5G NR, an channel detection manner which is suitable for a current application scenario is determined based on at least a radio communication service type and/or a cell load condition, thereby reducing a processing load of a base station and a user equipment while improving bandwidth allocation efficiency and resource utilization efficiency, thus improving system operation efficiency.

Other aspects of the embodiments of the present disclosure are given in the following description, in which the detailed description is used for fully disclosing, without limiting, preferred embodiments of the embodiments of the disclosed disclosure.

BRIEF DESCRIPTION OF THE DRAWINGS

The present disclosure can be understood better with reference to the detail description given in conjunction with the drawings in the following. The same or similar element is indicated by the same or similar reference numeral throughout all the drawings. The drawings, together with the following detailed description, are incorporated into and form a part of the specification, and serve to further illustrate the preferred embodiments of the present disclosure and to explain the principle and advantages of the present disclosure by way of example. In the drawings.

DETAILED DESCRIPTION OF EMBODIMENTS

Figure 1:
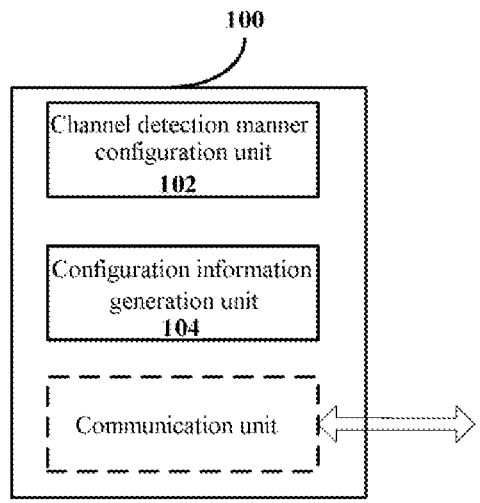
FIG. 1 is a block diagram showing an example of a functional configuration of a device on a base station side in a wireless communication system according to an embodiment of the present disclosure.

Exemplary embodiments of the present disclosure will be described below in conjunction with the drawings. For the sake of clarity and conciseness, not all the features of practical embodiments are described in the specification. However, it is to be understood that numerous embodiment-specific decisions shall be made during developing any of such actual embodiments so as to achieve the developer's specific goals, for example, to comply with system-related and business-related constraining conditions which will vary from one embodiment to another. Furthermore, it is also to be understood that although the development work may be very complicated and time-consuming, for those skilled in the art benefiting from the present disclosure, such development work is only a routine task.

It is further to be noted here that, to avoid obscuring the present disclosure due to unnecessary details, only the device structure and/or processing step closely related to the solution of the present disclosure are shown in the drawings, and other details less related to the present disclosure are omitted.

Hereinafter, the embodiments of the present disclosure are described below in detail with reference to FIG. 1 to FIG. 23. Hereinafter, the description is given in the following order.

1. Examples of configurations of a device on a base station side according to the present disclosure
   1-1. Configuration of a channel detection manner
   1-2. Configuration of an initial BWP
      1-2-1. Example in a downlink communication scenario
      1-2-2. Example in an uplink communication scenario
   1-3. Configuration and scheduling of a BWP
   1-4. Configuration of BWP switching
   1-5. Configuration of a LBT type on a BWP
2. Examples of configurations of a device on a user equipment side according to the present disclosure
   2-1. Example in a downlink communication scenario
   2-2. Example in an uplink communication scenario
   2-3. Example in a BWP switching scenario 3. Method embodiments according to the present disclosure 4. Computing device for implementing the device(s) and the method(s) according to the embodiments of the present disclosure 5. Application examples of the technology according to the present disclosure 5-1. Application examples of a base station 5-2. Application examples of a user equipment Before describing in detail the embodiments according to the present disclosure, it should be noted that the technology according to the present disclosure will be described by taking 60 GHZ band in the NR as an example of an unlicensed band in the following description. However, it should be understood that the present disclosure is not limited thereto and is similarly applicable to a channel detection and configurations on other unlicensed bands.

1. Examples of Configurations of a Device on a Base Station Side According to the Present Disclosure

[1-1. Configuration of a Channel Detection Manner]

FIG. 1 is a block diagram showing an example of functional configuration of a device on a base station side in a wireless communication system according to an embodiment of the present disclosure.

As shown in FIG. 1, a device 100 according to the example may include a channel detection manner configuration unit 102 and a configuration information generation unit 104. An example of a functional configuration of each unit is described in detail below.

The channel detection manner configuration unit 102 may be configured to determine, based on at least a radio communication service type and/or a cell load condition, a channel detection manner for an unlicensed band.

At present, although the NR supports a carrier bandwidth of a hundreds-of-megahertz magnitude, in some application scenarios, it is unnecessary to provide a single user equipment with such a large bandwidth. According to a principle of allocating the bandwidth with high efficiency, a concept of "bandwidth part (BWP)" may be introduced. Compared with a carrier/component carrier (CC), the bandwidth part enables a smaller granularity of resource allocation, thereby improving flexibility of spectrum resource scheduling, and improving bandwidth allocation efficiency and resource utilization efficiency. In the conventional LTE system, a configuration for performing channel detection on an unlicensed band is notified by a field "carrier indicator" in a scheduling downlink control information (DCI), and a position of the channel detection is determined by the number and a position of a sub-carrier. That is, information contained in the uplink and downlink scheduling DCI indicates a base station or a user equipment to detect on which bandwidth in the frequency band whether a communication resource is occupied or not. However, in the NR system, due to the introduction of the BWP concept, the configuration for the channel detection on the unlicensed band is required to determine whether the channel detection is performed on a scheduled component carrier (of a wide bandwidth) or on an activated BWP (of a narrow bandwidth) in the component carrier.

Therefore, with respect to the different resource scheduling units (the carrier/component carrier and the bandwidth part) that are available in the NR system at the same time, when the channel detection is performed on the unlicensed band, channel detection manners based on different bandwidth granularities may be configured based on at least a service type of the current application scenario, so as to reduce a processing load and complexity of the base station and the user equipment in performing the channel detection while improving the resource allocation efficiency.

Here, the channel detection manner may include component carrier based channel detection and bandwidth part based channel detection. A bandwidth part is a part obtained by dividing a scheduled component carrier and having a bandwidth smaller than the bandwidth of the component carrier. Multiple bandwidth parts may be obtained by dividing the same component carrier, and they may have the same or different bandwidths, center frequency point positions and parameter configurations (numerology). Depending on an actual application scenario, one bandwidth part may be activated at a time for a single service transmission for a single user equipment, or multiple bandwidth parts may be simultaneously activated for different service transmissions. The component carrier based channel detection and the bandwidth part based channel detection are described in detail below.

The channel detection manner configuration unit 102 may be further configured to determine the channel detection manner to be the component carrier based channel detection in a case that the radio communication service type requires a large bandwidth. Specifically, for a service type that requires a large bandwidth for data transmission (for example, an enhanced mobile broadband (eMBB) service), in order to perform the channel detection and meet forward compatibility of some signaling, the base station or the user equipment that prepares to access the channel needs to detect merely the bandwidth occupied by the scheduled component carrier, and thus it is unnecessary to add information regarding a center frequency point and a size of the channel bandwidth to be detected to the corresponding signaling. In this way, the component carrier based channel detection may be performed without changing the original signaling contents in the LTE.

In another aspect, the channel detection manner configuration unit 102 may be further configured to determine the channel detection manner to be the bandwidth part based channel detection in a case that the radio communication service type requires a small bandwidth. Specifically, for a service type that only requires a small bandwidth for data transmission (for example, a massive machine type of communication (mMTC) service), since it may be unnecessary for a service for a single user equipment to occupy the entire bandwidth of the component carrier, in order to improve bandwidth resource utilization efficiency, the base station may schedule and configure multiple bandwidth parts in a component carrier to one or more user equipments. In this case, if the component carrier based channel detection is performed and the channel detection indicates an occupied state, communications for multiple services may be affected, thus affecting communication efficiency on the unlicensed band in the whole NR system. Therefore, with the bandwidth part based channel detection manner being configured, the base station or the user equipment only needs to perform the channel detection on the allocated one or more bandwidth parts. Compared with the component carrier based channel detection manner, the bandwidth part based channel detection manner can improve a probability of channel access and channel utilization efficiency, and such channel detection on a small bandwidth can reduce complexity of the detection, thereby reducing power consumption and a processing load of the base station and user equipment.

Furthermore, preferably, the channel detection manner configuration unit 102 may also determine a channel detection manner based on a cell load condition instead of the radio communication service type or in combination with the radio communication service type.

Specifically, in a case that a cell load is small, for example, in a case that almost the whole bandwidth of the component carrier is occupied by a certain service for a user equipment, the channel detection manner configuration unit 102 may be configured to determine the channel detection manner to be the component carrier based channel detection. In another aspect, in a case that a cell load is large, for example, in a case that there are multiple services for one or more user equipments at the same time, the channel detection manner configuration unit 102 may be configured to determine the channel detection manner to be the bandwidth part based channel detection.

Preferably, in order to achieve advantages of both the component carrier based channel detection and the bandwidth part based channel detection, the channel detection manner further includes mixed channel detection that combines the component carrier based channel detection with the bandwidth part based channel detection. In the mixed channel detection, firstly, the channel detection may be performed on the component carrier, and if a detection result indicates a busy state, then channel detection of a finer granularity is performed according to the scheduled bandwidth part. The mixed channel detection has an advantage of increasing a possibility of accessing to the unlicensed band of the NR system. With the mixed channel detection, if a result of the channel detection of the component carrier indicates that the channel is idle, all of services on the carrier bandwidth may perform transmission without performing further channel detection, which greatly reduces overhead for performing the channel detection on each bandwidth part. If the result of the channel detection of the component carrier indicates that the channel is busy, the channel detection may be switched to a BWP based channel detection, with which the channel detection is respectively performed on each of the scheduled bandwidth parts. Only service corresponding to a bandwidth part for which a result of the channel detection indicates an idle state may perform transmission, while other service continues listening and waiting. Thus, a channel access probability is improved.

It should be noted here that, although a configuration of the channel detection manner on the unlicensed band in the NR system is described by taking two factors, i.e. the radio communication service type and the cell load, as examples, according to an actual application scenario, other factors may be considered for the configuration in stead of and/or in combination with the above two factors, as long as at least one of the following advantages can be implemented: ensuring compatibility, reducing complexity and a processing load of channel detection, improving bandwidth allocation efficiency, and improving channel access probability.

Furthermore, it should be noted that, although according to the technology of the present disclosure, the above three channel detection manners are proposed based on the current development of the wireless communication technology, with the development of wireless communication technology in the future, there is also a possibility that there are channel detection manners based on three or more bandwidth granularities.

The configuration information generation unit 104 may be configured to generate configuration information including the determined channel detection manner. The configuration information is sent to the user equipment via high layer signaling (for example, RRC layer signaling, a MAC layer control element (CE) and the like), so as to indicate the channel detection manner to the user equipment.

[1-2. Configuration of an Initial BWP]

In a case that a channel detection manner is determined to be bandwidth part based channel detection or mixed channel detection, an uplink initial bandwidth part and a downlink initial bandwidth part should be configured, to implement uplink and downlink communications. The configuration of an initial bandwidth part is described in detail below for both a downlink communication scenario and an uplink communication scenario.

(1-2-1. Example in a Downlink Communication Scenario)

Figure 2:
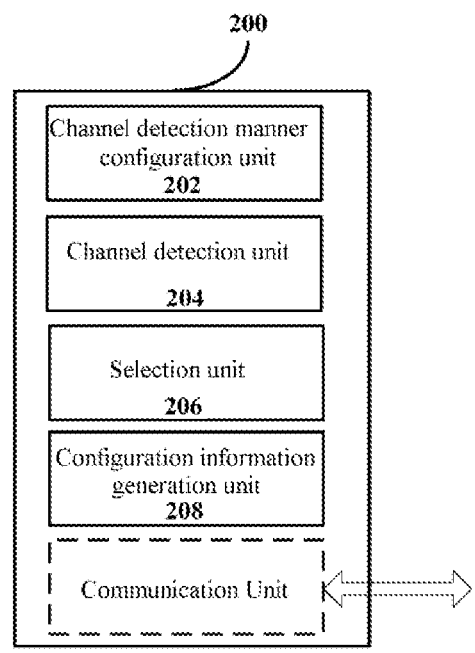
FIG. 2 is a block diagram showing another example of a functional configuration of a device on a base station side in a wireless communication system according to an embodiment of the present disclosure.

FIG. 2 is a block diagram showing another example of a functional configuration of a device on a base station side in a wireless communication system according to an embodiment of the present disclosure.

As shown in FIG. 2, a device 200 according to the example may include a channel detection manner configuration unit 202, a channel detection unit 204, a selection unit 206 and a configuration information generation unit 208. An example of a functional configuration of each unit is described in detail below.

An example of a function configuration of the channel detection manner configuration unit 202 is substantially the same as that of the above channel detection manner configuration unit 102, which is not described herein.

The channel detection unit 204 may be configured to perform, in a case that the channel detection manner is determined to be bandwidth part based channel detection or mixed channel detection, channel detection on one or more downlink initial bandwidth parts.

The one or more downlink initial bandwidth parts are allocated based on the current communication scenario. On an unlicensed band, in order to improve the channel access probability, preferably, multiple uplink/downlink initial bandwidth parts are configured. The multiple uplink initial bandwidth parts and the multiple downlink initial bandwidth parts may be configured and scheduled in pairs, or may be configured and scheduled separately, which is described in detail below.

The selection unit 206 may be configured to select, based on a result of the channel detection, a downlink initial bandwidth part, for which the result of the channel detection is idle and which has a high priority and/or has a simple LBT type, from the one or more downlink initial bandwidth parts as a bandwidth part for downlink transmission.

The results of channel detections performed by the channel detection unit 204 on multiple downlink initial BWPs may each be idle. In this case, the selection unit 206 may select, further based on at least one of the priority and the LBT type of each downlink initial BWP, a bandwidth part which is actually used for downlink transmission.

Multiple BWPs configured in one component carrier may be orthogonal to each other or partially overlapped with each other. In order to improve bandwidth utilization efficiency, in some application scenarios, multiple BWPs which are configured for different services or different users in one component carrier may be configured to have overlapped portions. For these overlapped portions, different services may share the allocated resource of a part in a puncturing manner or a multiplexing manner. Therefore, as an example, a priority of a BWP may be determined based on whether there is an overlapped portion between the BWP and other BWPs. For example, the BWP having an overlapped portion with other BWPs may be allocated with a low priority, and the BWP having no overlapped portion with other BWPs may be allocated with a high priority, such that the selection unit 206 may preferentially select an idle BWP of a high priority that has no overlapped portion, so as to improve the quality of the communication.

In another aspect, similar to determination of the LBT type in the LTE, a corresponding LBT type may be determined for a bandwidth part when channel detection is performed on the bandwidth part. The LBT type may include a simple type (for example, type2, 25 µs LBT) and a complex type (a LBT including a random backoff mechanism, for example, type1). Therefore, preferably, instead of or in combination with considering a priority of each BWP, the selection unit 206 may further preferentially select an idle BWP which has a simple LBT type, to increase channel access speed. The determination of the LBT type is described in detail later.

It should be noted that, in practice, in a case that there is a conflict between the two factors, i.e. the priority and the LBT type, the selection unit 206 may determine, based on an actual application scenario, which one of the priority and the LBT type is to be preferentially considered.

The configuration information generation unit 208 may be configured to generate configuration information including the selected downlink initial bandwidth part to be sent to the user equipment. Preferably, the configuration information generation unit 208 may be further configured to contain the configuration information including the selected downlink initial bandwidth part in downlink control information to be sent to the user equipment.

Figure 3:
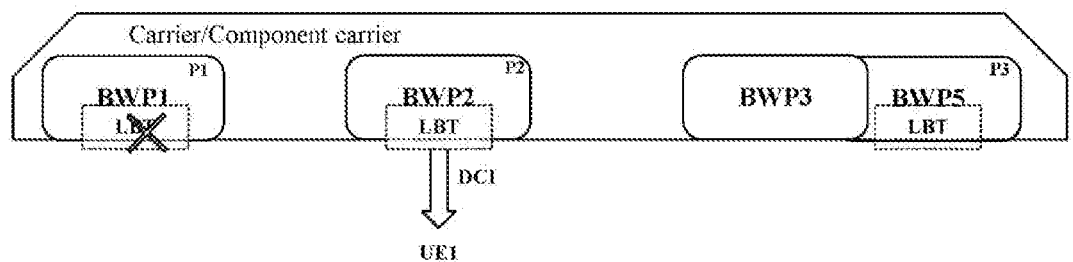
FIG. 3 is a schematic diagram showing an example of a configuration of a downlink initial bandwidth part (BWP) according to an embodiment of the present disclosure.

FIG. 3 is a schematic diagram showing an example of a configuration of a downlink initial BWP according to an embodiment of the present disclosure As shown in FIG. 3, it is assumed that a base station configures three downlink initial bandwidth parts BWP1, BWP2 and BWP5 in a component carrier, and the BWP1 has a highest priority of P1. However, a result (also referred to as a LBT result) of the channel detection on the BWP1 indicates that the channel is busy (which is indicated by a mark "x" in FIG. 3) and thus it cannot be selected. Each of results of channel detections on the BWP2 and the BWP5 indicates that the channel is idle, but the BWP5 has an overlapped portion with another bandwidth part, i.e. the BWP3, and thus it has a low priority (a priority of P3). In this case, preferentially, the BWP2 which is idle and has a priority of P2 (which is higher than the priority of P3) may be finally selected as a downlink initial BWP. Indication information of the downlink initial BWP may be sent to the user equipment UE1 through the DCI, to indicate a frequency domain position for receiving downlink data to the user equipment.

Preferably, in order to solve the problem of a large power consumption of the user equipment caused by the need of the user equipment to perform detection on the full bandwidth so as to receive downlink control information from the base station, in addition to generating configuration information including the channel detection manner as the configuration information generation unit 104 described above, the configuration information generation unit 208 may be further configured to generate initial bandwidth part configuration information including one or more downlink initial bandwidth parts as described above (for example, the BWP1, the BWP2 and the BWP5 as shown in FIG. 3) to be sent to the user equipment. The initial bandwidth part configuration information may be sent to the user equipment via high layer signaling (for example, RRC signaling, MAC CE and the like), such that the user equipment may detect, based on the received configuration information, downlink control information from the base station only on the one or more downlink initial bandwidth parts, so as to determine the frequency domain position (for example, the BWP2 shown in FIG. 3) for receiving the downlink data. In this way, compared with performing detection on the full bandwidth, power consumption on the user equipment side is reduced. It should be noted that, the initial bandwidth part configuration information may be, for example, sent to the user equipment via RRC signaling after RRC connection is established. Before the RRC connection is established, since there is no reliable connection between the base station and the user equipment side, the base station and the user equipment may communicate with each other, for example, by an uplink/downlink default bandwidth part which is preset by the equipment manufacturer, to establish a connection.

Preferably, the initial bandwidth part configuration information may further include one or more uplink bandwidth parts paired with one or more downlink initial bandwidth parts. The one or more uplink bandwidth parts may be, for example, used by the user equipment to perform reception feedback (ACK/NACK), report channel state information (CSI), send an uplink scheduling request (SR) and perform data transmission and the like. Alternatively, since in a case of downlink transmission, the user equipment only needs a small uplink transmission bandwidth, in order to reduce overhead, the one or more uplink bandwidth parts may be not configured, and the user equipment may use the uplink default bandwidth part to send corresponding downlink data reception feedback, CSI report and SR and the like.

(1-2-2. Example in an Uplink Communication Scenario)

Figure 4:
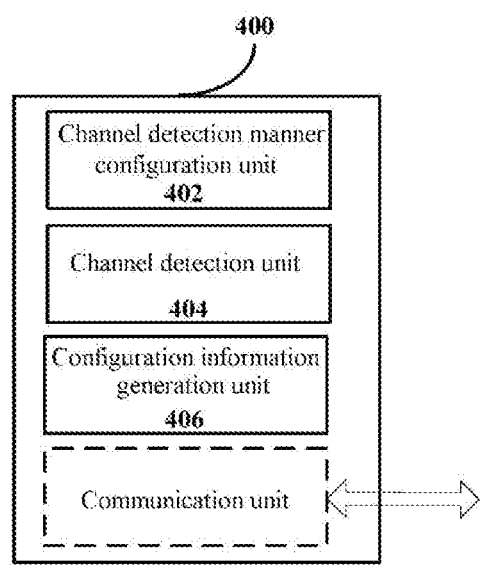
FIG. 4 is a block diagram showing yet another example of a functional configuration of a device on a base station side in a wireless communication system according to an embodiment of the present disclosure.

FIG. 4 is a block diagram showing yet another example of a functional configuration of a device on a base station side in a wireless communication system according to an embodiment of the present disclosure.

As shown in FIG. 4, a device 400 according to the example may include a channel detection manner configuration unit 402, a channel detection unit 404 and a configuration information generation unit 406. An example of a functional configuration of each unit is described in detail below.

An example of a function configuration of the channel detection manner configuration unit 402 is substantially the same as that of the above channel detection manner configuration unit 102, which is not described herein.

The configuration information generation unit 406 may be configured to generate, in response to an uplink scheduling request from a user equipment, initial bandwidth part configuration information including one or more uplink initial bandwidth parts to be sent to the user equipment, in a case that a channel detection manner includes a bandwidth part based channel detection.

Specifically, in a case that the user equipment needs to perform uplink service transmission, the user equipment may send an uplink scheduling request (SR) to the base station through an uplink default BWP or an uplink BWP paired with a downlink BWP used by the base station for downlink transmission that is notified by the base station in the last downlink transmission. After receiving the uplink scheduling request, the base station may allocate one or more uplink initial bandwidth parts for the user equipment by comprehensively considering the network condition, and notifies the user equipment of configuration information including the one or more uplink initial bandwidth parts via high layer signaling (for example, RRC signaling, MAC CE and the like).

The configuration information generation unit 406 may be further configured to generate one or more pieces of uplink scheduling information corresponding to the one or more uplink initial bandwidth parts.

The channel detection unit 404 may be configured to perform channel detections on one or more downlink bandwidth parts paired with the one or more uplink initial bandwidth parts, so as to send the generated one or more pieces of uplink scheduling information to the user equipment through one or more downlink bandwidth parts for which the results of the channel detections are idle.

Specifically, although the base station may configure one or more uplink initial BWPs for the user equipment via the high layer signaling, the base station still needs to send uplink scheduling information corresponding to the one or more uplink initial BWPs to the user equipment through an idle downlink BWP, to indicate resource allocation for uplink transmission to the user equipment. As an example, it is assumed that an uplink initial BWP and a downlink BWP paired with the uplink initial BWP share the frequency resource of the same part, and only in a case that the downlink BWP corresponding to the uplink initial BWP is detected to be idle, the base station may send uplink scheduling information corresponding to the uplink initial BWP to the user equipment through the downlink BWP. For the uplink initial BWP the downlink BWP corresponding to which is occupied, the base station does not send the corresponding uplink scheduling information. In this way, the user equipment perform channel detection only on uplink initial BWPs for which corresponding uplink scheduling information is received, and select, among the uplink initial BWPs, a final uplink initial BWP for uplink transmission.

Alternatively, as an example embodiment, one or more pieces of uplink scheduling information corresponding to one or more uplink initial bandwidth parts may be generated after the channel detection unit 404 performs channel detection on corresponding downlink bandwidth parts. Specifically, in a case that the channel detection unit 404 determines a result of channel detection for a downlink bandwidth part is idle, the configuration information generation unit 406 may generate uplink scheduling information of an uplink initial bandwidth part corresponding to the downlink bandwidth part and send the uplink scheduling information to the user equipment through the downlink BWP.

Preferably, the initial bandwidth part configuration information generated by the configuration information generation unit 406 may further include priority configuration information and LBT type configuration information of one or more uplink initial bandwidth parts, for the user equipment to select an appropriate uplink initial bandwidth part for uplink transmission. Similarly, the priority may be determined, for example, based on whether there is an overlapped portion between the uplink initial bandwidth part and other BWPs and/or other factors.

Figure 5:
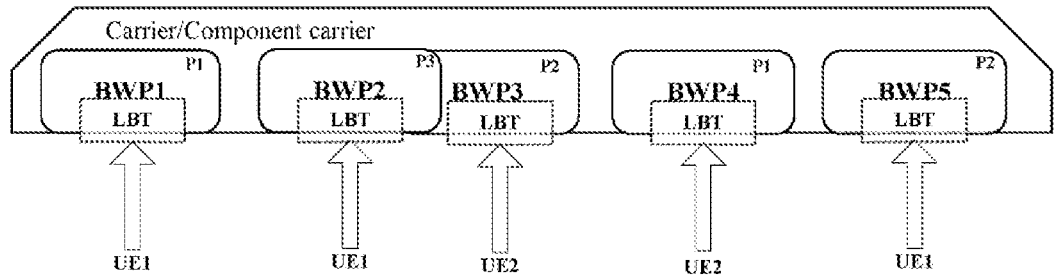
FIG. 5 is a schematic diagram showing an example of a configuration of an uplink initial BWP according to an embodiment of the present disclosure.

FIG. 5 is a schematic diagram showing an example of a configuration of an uplink initial BWP according to an embodiment of the present disclosure.

Since multiple user equipments may share the bandwidth covered by the same component carrier, there may be overlapped portions between uplink initial bandwidth parts allocated for different user equipments. Therefore, an uplink initial bandwidth part with an overlapped portion may be allocated with a low priority, and an uplink initial bandwidth part with no overlapped portion may be allocated with a high priority.

As shown in FIG. 5, it is assumed that a user equipment UE1 is allocated with uplink initial bandwidth parts BWP1, BWP2 and BWP5, and a user equipment UE2 is allocated with uplink initial bandwidth parts BWP3 and BWP4. There is an overlapped portion between the BWP2 and the BWP3. For the user equipment UE1, it is assumed that priorities of the uplink initial bandwidth parts BWP1, BWP2 and BWP5 allocated for the user equipment UE1 are set as P1, P3 and P2 respectively, in which P1 indicates the highest priority and P3 indicates the lowest priority. A configuration of an uplink initial BWP is described below by taking the user equipment UE1 as an example. Processing for the user equipment UE2 is similar to that for the user equipment UE1, which is not repeated herein.

A base station send initial bandwidth part configuration information of the user equipment UE1 to the user equipment UE1 via, for example, RRC signaling. Next, the base station performs channel detection on downlink bandwidth parts BWP1', BWP2' and BWP5' corresponding to the uplink initial bandwidth parts BWP1, BWP2 and BWP5, respectively. As shown in FIG. 5, it is assumed that all the results of channel detections are idle. Then, the base station sends uplink scheduling information (UL grant) regarding the BWP1 to the user equipment UE1 through the BWP1', sends uplink scheduling information (UL grant) regarding the BWP2 to the user equipment UE1 through the BWP2', and sends uplink scheduling information (UL grant) regarding the BWP5 to the user equipment UE1 through the BWP5'. In this way, the user equipment UE1 may determine an uplink initial bandwidth part to be detected subsequently (BWP1, BWP2 and BWP5) by decoding the received uplink scheduling information, and select, based on the result of the channel detection and the priority and/or the LBT type, an appropriate uplink initial bandwidth part as an bandwidth part for uplink transmission.

Since scheduling information of each uplink initial bandwidth part will be sent to the user equipment via downlink control information (DCI) which is transmitted on a downlink bandwidth part corresponding to the uplink initial bandwidth part, preferably, configuration information of the one or more downlink bandwidth parts may also be included in the initial bandwidth part configuration information to be sent to the user equipment, so as to reduce power consumed by the user equipment in detecting DCI from the base station.

Referring back to FIG. 4, preferably, the channel detection unit 404 may be further configured to perform channel detection on a downlink default bandwidth part or a downlink bandwidth part paired with an uplink initial bandwidth part used by the user equipment for uplink transmission, and to perform, in a case that the result of the channel detection is idle, uplink reception feedback (ACK/NACK) and/or measurement configuration through the downlink default bandwidth part or the downlink bandwidth part paired with the uplink initial bandwidth part used by the user equipment for uplink transmission.

The uplink default bandwidth part and the downlink default bandwidth part described above may be pre-configured, for example, by the equipment manufacturer. Preferably, a BWP with a small bandwidth may be configured as a default BWP, and further preferably, a bandwidth of the default BWP may be greater than or equal to a bandwidth occupied by a synchronization signal block (SS block).

Configurations of an initial BWP in a downlink communication scenario and in an uplink communication scenario are described above with reference to FIG. 2 to FIG. 5. However, it should be understood that, the initial BWP may also be a default BWP. In this way, it is unnecessary to perform the above processing, and a base station and a user equipment each detect whether a corresponding default BWP is idle in a case of performing service transmission, and perform transmission through the default BWP in a case that the corresponding default BWP is idle. However, since the default BWP generally has a small bandwidth and thus fails to meet the requirement of uplink/downlink service transmission, it is required to still trigger the base station to perform the above processing, so as to configure more appropriate uplink/downlink initial bandwidth parts.

[1-3. Configuration and Scheduling of a BWP]

According to above embodiment, configuration information of the BWP may be included in high layer signaling (for example, RRC signaling or MAC CE and the like) and/or physical layer signaling (for example, the DCI). Specifically, configuration information of multiple BWPs to be selected may be transmitted via, for example, RRC signaling, and configuration information of the BWP regarding uplink and downlink resource allocation and scheduling may be transmitted via the DCI.

In a case of transmitting the configuration information regarding the BWP via the DCI, as an example, downlink control information including the BWP configuration information may be generated by modifying an existing downlink control information format, adding a new downlink control information format, or adding new, separate downlink control information.

In a normal communication state, different BWP may be activated and deactivated by a scheduling DCI. The scheduling DCI is DCI conventionally used in a LTE, which is basic scheduling for uplink and downlink services. However, in a case of introducing a concept of the BWP, configuration information of the BWP needs to be added in the DCI.

As an example, the configuration information of the BWP may be added in the existing downlink control information format. Specifically, a field for the BWP may be newly added in the existing DCI format of the scheduling DCI to modify the existing DCI format, so as to indicate the current BWP configuration to the user equipment. The newly added field may be similar to a indicator of a component carrier in the existing DCI, and a position and a bandwidth of the currently configured BWP may be indicated by the number of the BWP of n (where n is determined depending on the maximum number of configurable BWPs for uplink/downlink transmission) bits. In this case, a BWP configuration table is required to be stored in advance on the user equipment side, such that the user equipment may search the stored BWP configuration table based on the number of the BWP indicated in the received scheduling DCI, so as to determine the position, the bandwidth and a parameter configuration of the BWP. It should be noted that, in a case that uplink and downlink BWPs are configured in pairs, configuration information stored in the BWP configuration table is also stored in pairs, and the number of the BWP indicated in the DCI may be similarly modified to the number of the BWP pair.

Here, a position and description of a newly added field regarding BWP configuration is described by taking DCI format 0A as an example.

DCI Format 0A

Carrier indicator—0 or 3 bits. This field is present according to the definitions in [3].

BWP indicator—n bits. n depends on the maximum number of configured BWP for DL/UL.

The above field "Carrier indicator" represents the number of a carrier, which may be of 0 or 3 bits. The newly added field BWP indicator represents the number of the BWP, which may be of n bits. Furthermore, alternatively, as another manner to modify the existing DCI format, bit(s) regarding the BWP may be added to the field regarding a component carrier in the existing DCI format of the scheduling DCI. That is, the configuration of the BWP is bundled with the configuration of the component carrier, such that the user equipment may acquire information of the above two configurations when decoding the DCI. For example, still taking the above DCI Format 0 as an example, the original field Carrier indicator may be increased from 3 bits to 5 bits, in which the last 2 bits are used to indicate a BWP activated in the current component carrier. However, the above manner may cause poor forward compatibility, and an LTE user equipment which is not provided with the same decoding rule cannot decode this field in the DCI, failing to acquire even configuration information of the component carrier.

Alternatively, as another example, instead of modifying the existing DCI format, a new downlink control information format may be added to include the configuration information of the BWP, such that the base station may select, based on whether the user equipment is an LTE user equipment or an NR user equipment, to send the original DCI format or the newly added DCI format, to ensure that each user equipment can correctly decode the DCI information.

Figure 6:
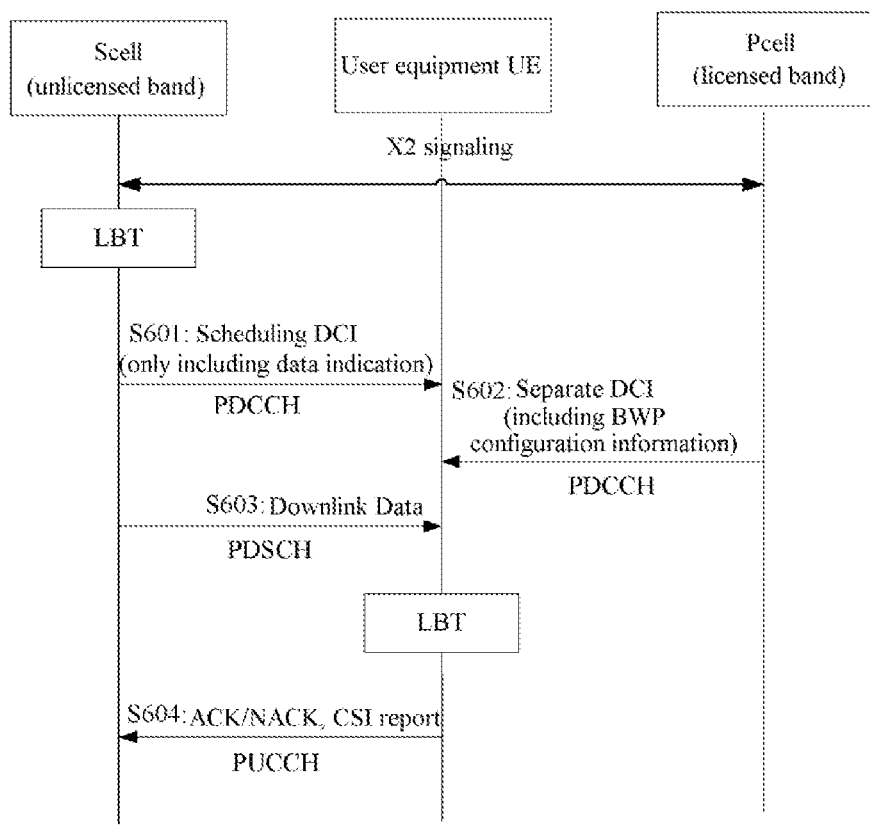
FIG. 6 is a flowchart showing a signaling interaction process in a scenario of licensed assisted access (LAA) self-carrier scheduling according to an embodiment of the present disclosure.

As another example, the existing scheduling DCI may also not be used, and additional, separate DCI may be added to specifically indicate the configuration of the BWP, which improves flexibility of scheduling. The BWP may be activated/deactivated or configured not only in the scheduling, but also at any other time. The manner of carrying the BWP configuration information through separate DCI may be preferably used in a scenario of licensed assisted access (LAA) self-carrier scheduling. FIG. 6 shows a signaling interaction process in the scenario of LAA self-carrier scheduling according to an embodiment of the present disclosure.

In an example shown in FIG. 6, Scell indicates a secondary cell that operates on an unlicensed band, for example, a transmission reception point (TRP), and Pcell indicates a primary cell that operates on a licensed band, for example, gNodeB (gNB). It is assumed that the primary cell and the secondary cell may communicate with each other through a X2 interface.

As shown in FIG. 6, after performing LBT, the Scell sends, in step S601, a scheduling DCI to a user equipment UE through a PDCCH on the unlicensed band. The scheduling DCI only includes data indication. Since the scheduling DCI relates to self-carrier scheduling, the scheduling DCI may be sent after a resource is acquired on the unlicensed band. Then, in step S602, the Pcell sends a separate DCI including BWP configuration information to the user equipment UE through a PDCCH on the licensed band. In an embodiment, the separate DCI may include only the BWP configuration information. Next, in step S603, the Scell sends data to the user equipment through a PUSCH. After receiving the data, the user equipment UE performs LBT on an uplink default BWP or an uplink BWP configured in the separate DCI, and then, in step S604, the user equipment UE sends an ACK/NACK feedback or a CSI report through a PUCCH on the unlicensed band on an uplink BWP which is detected to be idle.

According to the example described in FIG. 6, by sending a separate DCI including the BWP configuration information on a licensed band, valuable unlicensed band resources are not occupied, and signaling overhead on the unlicensed band is not increased, and the BWP is configured flexibly.

It should be noted here that, although the steps are numbered for convenience of description in the example shown in FIG. 6, these numbers do not mean to limit the order for executing these steps. In fact, some steps may be executed in parallel, or the steps may be executed in other orders. For example, the sending of the separate DCI in step S602 may be performed simultaneously with the sending of the scheduling DCI in step S601. For another example, although, in FIG. 6, sending the scheduling DCI through the PDCCH in step S601 and sending downlink data through the PUSCH in step S603 are shown as two separate steps, in fact, the two types of information are simultaneously sent on different channels.

In addition, in an embodiment of the present disclosure, in a case that configuration and scheduling of the BWPs are performed on an unlicensed band, it may be selectively determined whether configuration and scheduling of the BWP are performed in pairs. It should be noted that, although the following description is made by taking a case that the scheduling DCI is used for carrying the BWP configuration information as an example, those skilled in the art may modify the following signaling interaction process, according to the principle of the present disclosure, to be suitable for a case that a separate DCI is used for carrying the BWP configuration information.

Figure 7:
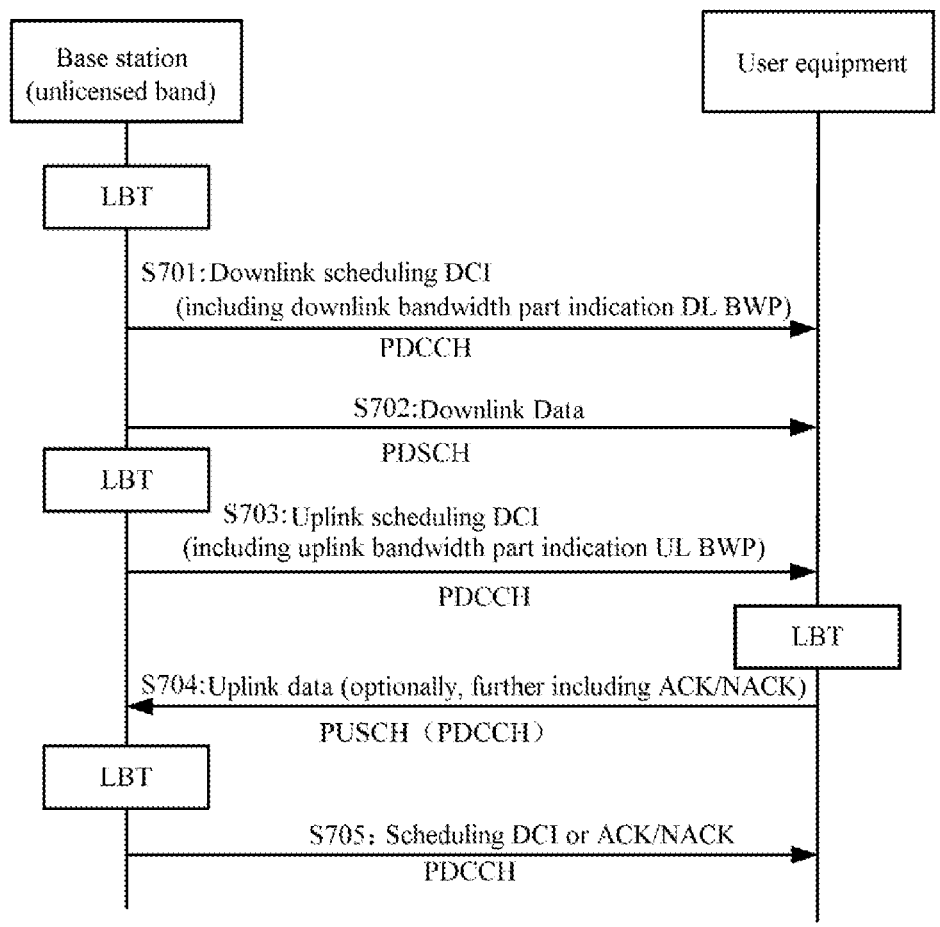
FIG. 7 is a flowchart of a signaling interaction process of BWP scheduling in a frequency division duplexing (FDD) system according to an embodiment of the present disclosure.

In a frequency division duplex (FDD) system, an uplink bandwidth part may not share the frequency resource of the same part with a downlink bandwidth part, to reduce interference of a system in frequency selection due to overlapping in resource selection. Therefore, in a case of performing scheduling, it is unnecessary to schedule uplink and downlink bandwidth parts in pairs. Instead, the downlink bandwidth parts are scheduled in a case that a base station needs to perform downlink service transmission, and the uplink bandwidth parts are scheduled only in a case that a user equipment needs to perform uplink service transmission. This unbundled BWP scheduling manner improves scheduling flexibility and spectrum utilization efficiency. FIG. 7 is a flowchart showing a signaling interaction process of a BWP scheduling example in a frequency division duplexing (FDD) system according to an embodiment of the present disclosure.

As shown in FIG. 7, in downlink transmission, after performing LBT on a corresponding downlink BWP, a base station sends downlink scheduling DCI to a user equipment through a physical downlink control channel (PDCCH) on an unlicensed band in step S701. The downlink scheduling DCI includes indication information DL BWP of the downlink BWP, to indicate the frequency domain position of the downlink BWP to the user equipment. In step S702, the base station sends the downlink data to the user equipment through a physical downlink shared channel (PDSCH), such that the user equipment may receive downlink data at the previously notified frequency domain position. Then, similarly, after performing the LBT, the base station sends, in step S703, uplink scheduling DCI to the user equipment through the PDCCH. The uplink scheduling DCI includes indication information UL BWP of the uplink BWP. The user equipment performs LBT on the corresponding uplink BWP based on the received uplink scheduling DCI. In step S704, the user equipment sends uplink data to the base station through the uplink BWP on a physical uplink shared channel (PUSCH). Alternatively, the user equipment may also send downlink reception feedback (ACK/NACK) to the base station through the uplink BWP on a physical uplink control channel (PUCCH), to indicate whether the downlink data is successfully received. Next, after performing the LBT, the base station performs the next scheduling or uplink reception feedback (ACK/NACK) on the PDCCH in step S705.

Figure 8:
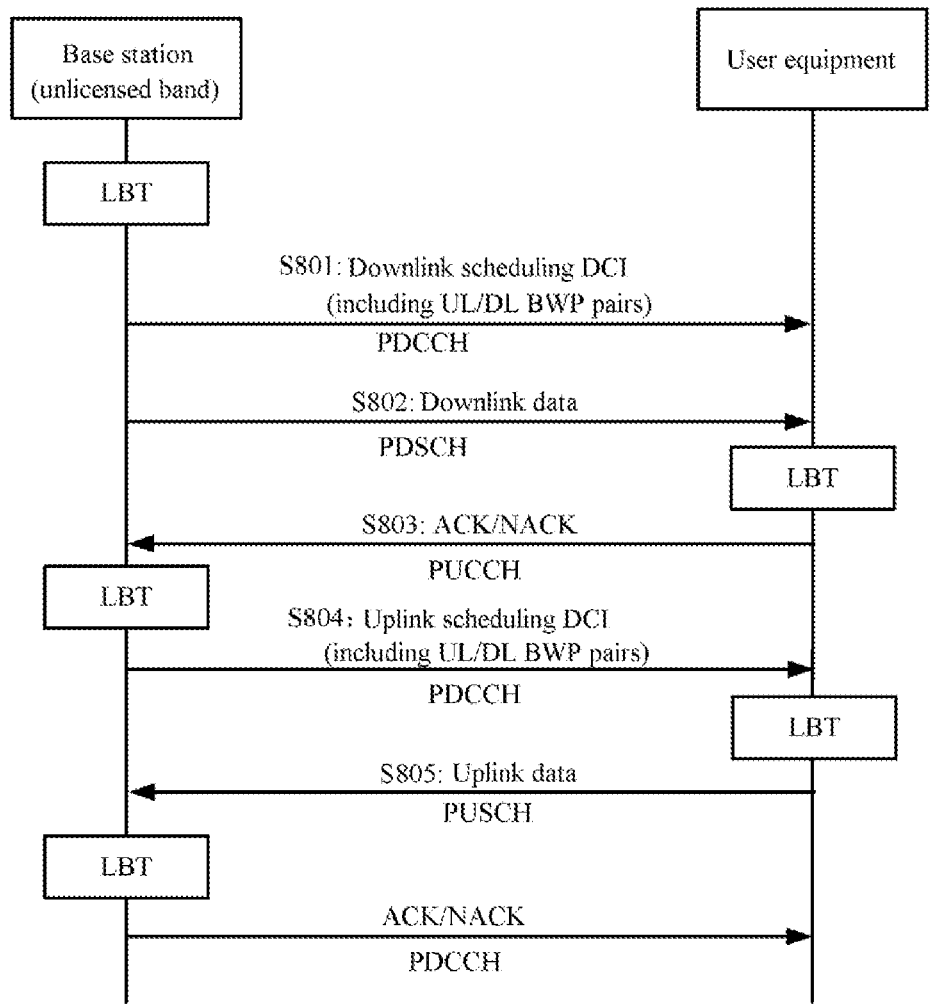
FIG. 8 is a flowchart showing a signaling interaction process of BWP scheduling in a time division duplexing (TDD) system according to an embodiment of the present disclosure.

In a time division duplex (TDD) system, since uplink and downlink communications share the frequency resource of the same part, a user equipment always obtains a pair of BWPs which use the same center frequency point no matter whether the scheduling is uplink scheduling or downlink scheduling. This is advantageous for the timely feedback when no additional scheduling is required, and reduces signaling overhead. FIG. 8 is a flowchart showing a signaling interaction process of BWP scheduling in a TDD system according to an embodiment of the present disclosure.

As shown in FIG. 8, the processing in steps S801 and S802 is substantially the same as the processing in steps S701 and S702 shown in FIG. 7, and the only difference is that BWP configuration information included in a downlink scheduling DCI in step S801 includes uplink/downlink BWP pair (UL/DL BWP pair). In this way, after receiving the downlink data from a base station, a user equipment may directly perform LBT on the uplink BWP in the uplink/downlink BWP pair. Then, in step 803, the user equipment sends ACK/NACK feedback through the uplink BWP on a PUCCH in step S803, such that it is unnecessary to perform additional uplink scheduling by the base station as described in the example shown in FIG. 7. In uplink transmission, similarly, the base station sends uplink scheduling DCI to the user equipment in step S804, where the uplink scheduling DCI also includes a pair of uplink/downlink BWP (UL/DL BWP pair). After performing LBT on the uplink BWP, the user equipment performs uplink data transmission through the uplink BWP on a PUSCH in step S805. After receiving the uplink data, the base station performs LBT on the corresponding downlink BWP and sends ACK/NACK feedback through the downlink BWP on a PDCCH without additional scheduling.

It can be seen that, in order to perform a complete uplink or downlink communication, two scheduling (scheduling of downlink BWP and scheduling of uplink BWP) are performed in the FDD system as described in FIG. 7, while in the TDD system as described in FIG. 8, only one scheduling (scheduling for uplink/downlink BWP pairs) is performed. Therefore, the manner of configuration and scheduling in pairs has the advantage of a small overhead, while the flexibility may be not as good as that of the manner of separate configuration and scheduling. Those skilled in the art may select an appropriate manner according to the actual application scenario.

It should be noted that, the signaling interaction processes in the FDD system and the TDD system described above with reference to FIGS. 7 and 8 are only examples, and those skilled in the art may also make appropriate modifications according to the principle of the present disclosure and actual conditions. For example, in the FDD system, in a case that the user equipment does not need to perform uplink service transmission and only needs to perform reception feedback on downlink data, instead of performing the above step S703, the user equipment UE may perform channel detection on the default BWP. Moreover, in a case that a result of channel detection is idle, in step S704, the user equipment performs ACK/NACK feedback through the default BWP. For another example, although not shown in FIG. 8, in a case that the user equipment UE needs to perform uplink service transmission, the user equipment may send uplink scheduling request by using the uplink BWP in the BWP pair allocated by the previous scheduling. Apparently, all such variations should be considered as falling within the scope of the present disclosure.

Furthermore, it should be noted that, although the steps are numbered chronologically for convenience of description in the example shown in FIGS. 7 and 8, these numbers do not represent the execution order of these steps. In fact, some steps may be executed in parallel, or the steps may be executed in other orders.

[1-4. Configuration of BWP Switching]

Figure 9:
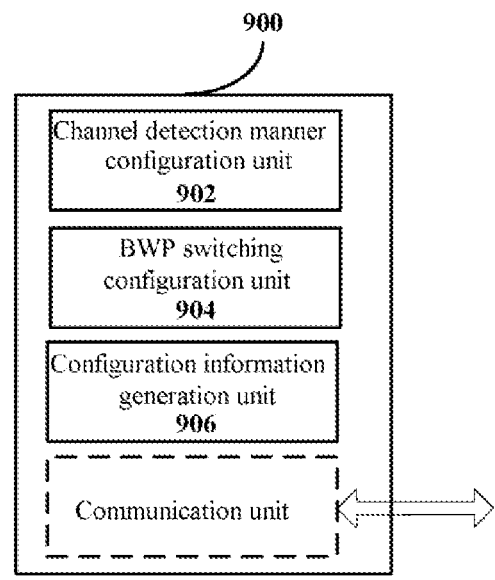
FIG. 9 is a block diagram showing still another example of a functional configuration of a device on a base station side in a wireless communication system according to an embodiment of the present disclosure.

FIG. 9 is a block diagram showing still another example of a functional configuration of a device on a base station side in a wireless communication system according to an embodiment of the present disclosure.

As shown in FIG. 9, a device 900 according to the example may include a channel detection manner configuration unit 902, a BWP switching configuration unit 904 and a configuration information generation unit 906. An example of functional configuration of each unit is described in detail below.

An example of a function configuration of the channel detection manner configuration unit 902 is substantially the same as that of the above channel detection manner configuration unit 102, which is not described herein.

The BWP switching configuration unit 904 may be configured to: in a case that a LBT timer on a base station side expires, perform channel detection on a downlink default bandwidth part, and switch, in a case that the result of the channel detection is idle, to the downlink default bandwidth part from a current downlink bandwidth part; or perform channel detection on one or more downlink candidate bandwidth parts, and switch from the current downlink bandwidth part to a downlink candidate bandwidth part, for which the result of the channel detection is idle and which has a high priority and/or has a simple LBT type, among the one or more downlink candidate bandwidth parts.

Activation and configuration of a BWP are performed via the DCI. In a case that BWP switching is required, for an unlicensed band, it is required to additionally detect a state of a channel for the switching signaling. If the result of detection indicates that the channel is busy, the entire switching process is postponed until the channel detection indicates an idle state. In addition, the BWP of the initial configuration may be unavailable due to uncertainty of channel acquisition at a transmitter/receiver side. Therefore, preferably, according to an embodiment of the present disclosure, the BWP switching at the transmitter/receiver side may be triggered by setting a timer.

Specifically, in a case that the LBT timer on the base station side expires, that is, in a case that a duration in which the channel state of the downlink BWP detected by the base station is busy exceeds the time of the LBT timer, the BWP switching configuration unit 904 may automatically switch to the default BWP to perform channel detection, and perform downlink transmission through the default BWP in a case that the result of detection is idle. In this way, by reducing the channel bandwidth to be detected and reducing the radio frequency requirement for detection, an access probability can be increased. In this case, although the originally scheduled service may not perform transmission on the default BWP, the communication between the base station and the user equipment may be maintained, which is equivalent to a buffer for the original service.

Alternatively, in a case that the amount of data transmission for the current downlink service is large and the default BWP cannot meet the requirement, the BWP switching configuration unit 904 may also be configured to switch to perform channel detection on one or more downlink candidate bandwidth parts, and switch from the current downlink bandwidth part to a downlink candidate bandwidth part, for which the result of the channel detection is idle and which has a high priority and/or has a simple LBT type, among the one or more downlink candidate bandwidth parts. The process of performing channel detection on multiple downlink candidate BWPs and selecting an appropriate downlink candidate BWP is substantially the same as the above process of configuring a downlink initial BWP, which is not described in detail herein. In this case, it may be ensured that the originally scheduled service performs transmission on the appropriate BWP. However, the configuration process also takes additional signaling and time, which may result in switching delay to an extent.

In another aspect, in a case that the LBT timer on the user equipment side expires, the user equipment may also similarly switch from the current uplink BWP to an uplink default BWP. However, in some cases, the default BWP may not meet the data transmission requirement, and thus the base station is required to re-allocate one or more uplink candidate BWPs to the user equipment for selection.

In this case, as a preferred embodiment, an uplink data reception timer may be maintained on the base station side, and it may be started after the base station receives an uplink scheduling request (SR) from the user equipment and sends uplink scheduling information (UL grant) to the user equipment, thereby being substantially consistent with the LBT timer maintained on the user equipment side. In this way, in a case that the LBT timer on the user equipment side expires, the uplink data reception timer on the base station side also expires due to failing to receive uplink data from the user equipment for a long period of time, such that the base station determines that the previously configured uplink BWP may be unavailable, thereby triggering to re-allocate one or more uplink candidate BWPs to the user equipment for selection.

Specifically, the configuration information generation unit 906 may be further configured to generate, in a case that an uplink data reception timer on a base station side expires, configuration information including one or more uplink candidate bandwidth parts to be sent to the user equipment. The configuration information may be similarly sent to the user equipment through high layer signaling. The configuration information generation unit 906 may be further configured to generate one or more pieces of uplink scheduling information corresponding to the one or more uplink candidate bandwidth parts. Then, a device on the base station side may perform channel detection on one or more downlink bandwidth parts paired with the one or more uplink candidate bandwidth parts, and send the generated one or more pieces of uplink scheduling information to the user equipment through one or more downlink bandwidth parts for which the results of the channel detections are idle. This configuration process is substantially the same as the above process of configuring the uplink initial BWP for the user equipment, which is not described herein.

Figure 10:
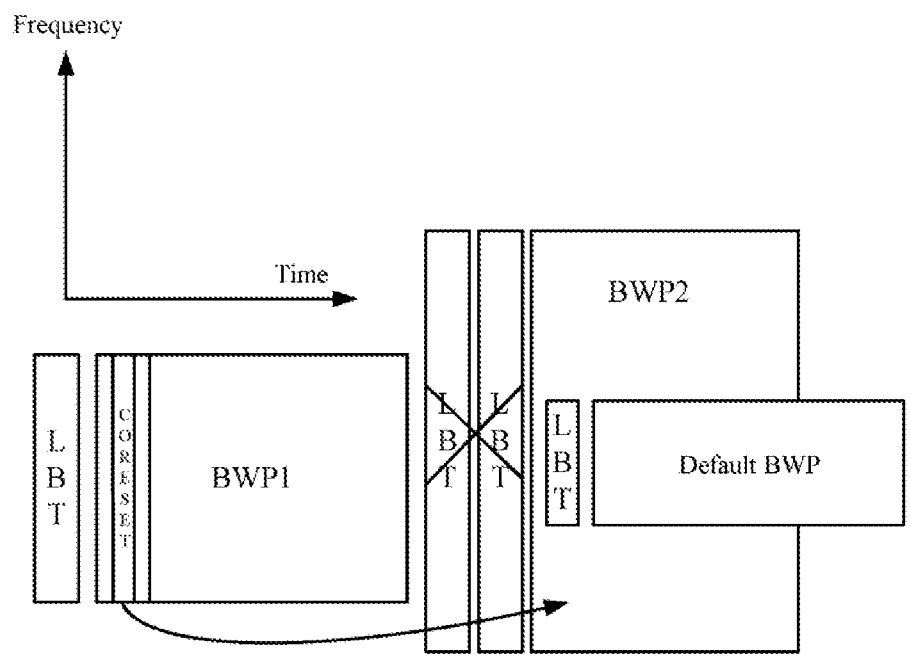
FIG. 10 is a schematic diagram showing an example of BWP switching according to an embodiment of the present disclosure.

FIG. 10 is a schematic diagram showing an example of BWP switching according to an embodiment of the present disclosure. As an example, FIG. 10 shows a case where a LBT timer on a base station side expires in downlink transmission, where "CORESET" represents a control resource set, which is a part of a control resource on a PDCCH, and is used to indicate to a user equipment that a bandwidth part BWP2 is to be scheduled next time while BWP1 is scheduled, such that the user equipment timely switches to a time-frequency resource corresponding to BWP2, so as to receive downlink data. As shown in FIG. 10, the control channel of the current BWP1 indicates that the downlink bandwidth part BWP2 is to be used for a next downlink transmission. However, the BWP2 is continuously occupied, which results in that the LBT timer on the base station side expires, such that the base station switches to a default BWP configured with a small bandwidth to perform the transmission thereon.

It should be understood that, the BWP switching shown in FIG. 10 is only an example. According to the principle of the present disclosure as described above, the device on the base station side/user equipment side may also switch to a reconfigured downlink/uplink candidate BWP.

[1-5. Configuration of a LBT Type on a BWP]

Figure 11:
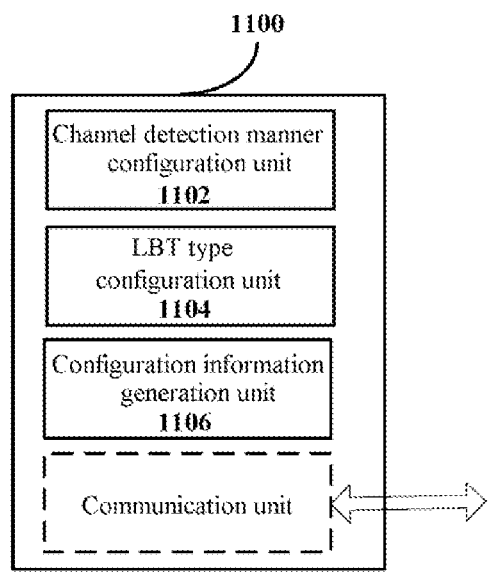
FIG. 11 is a block diagram showing still another example of a functional configuration of a device on a base station side in a wireless communication system according to an embodiment of the present disclosure.

FIG. 11 is a block diagram showing still another example of a functional configuration of a device on a base station side in a wireless communication system according to an embodiment of the present disclosure.

As shown in FIG. 11, a device 1100 according to the example may include a channel detection manner configuration unit 1102, a LBT type configuration unit 1104 and a configuration information generation unit 1106. An example of a functional configuration of each unit is described in detail below.

An example of a function configuration of the channel detection manner configuration unit 1102 is substantially the same as that of the above channel detection manner configuration unit 102, which is not described herein.

The LBT type configuration unit 1104 may be configured to determine a LBT type on an uplink/downlink BWP.

The configuration information generation unit 1106 may be further configured to generate configuration information of the LBT type to be sent to a user equipment.

Somehow similar to a process of performing transmission on an unlicensed band in multiple carriers in the LTE LAA, for downlink transmission, the conventional LBT detection manner for performing transmission in a component carrier is used, which may include the following two manners: Type A, for which the LBT of a complex type (for example, type 1) is performed in parallel on all BWPs; and Type B, for which the LBT of a type 1 is performed on a randomly selected BWP and the LBT of a simple type (for example, type 2) is performed on other BWPs. For uplink transmission, the base station may indicate the LBT type on the corresponding uplink BWP to the user equipment through high layer signaling (for example, RRC signaling, MAC CE and the like) or DCI. However, in a case that multiple uplink BWPs are configured for the user equipment, if the DCI is used for indication, it may occupy more physical layer resources. Therefore, it is preferable to indicate the LBT type used by the uplink BWP to the user equipment through the high layer signaling.

Furthermore, unlike the component carriers used in the LTE LAA, since there is a possibility of overlapping or complete coverage between BWPs in a frequency domain, a flow of the conventional LBT may be optimized based on a relationship between frequency domain ranges of a BWP before switching and a BWP after switching, to increase channel access speed.

As an example embodiment, the LBT type configuration unit 1104 may be configured to determine, when a base station or a user equipment switches between different bandwidth parts, a LBT type on a bandwidth part after switching for the base station or the user equipment based on a relationship between frequency domain ranges of a bandwidth part before switching and the bandwidth part after switching.

Specifically, if an overlapping degree between the frequency domain ranges of the bandwidth part before switching and the bandwidth part after switching is larger than or equal to a predetermined threshold, or the bandwidth part before switching covers the bandwidth part after switching, the LBT type on the bandwidth part after switching is determined to be a simple type. On the other hand, if the overlapping degree is smaller than the predetermined threshold, the LBT type on the bandwidth part after switching is determined to be a complex type.

Figure 12A:
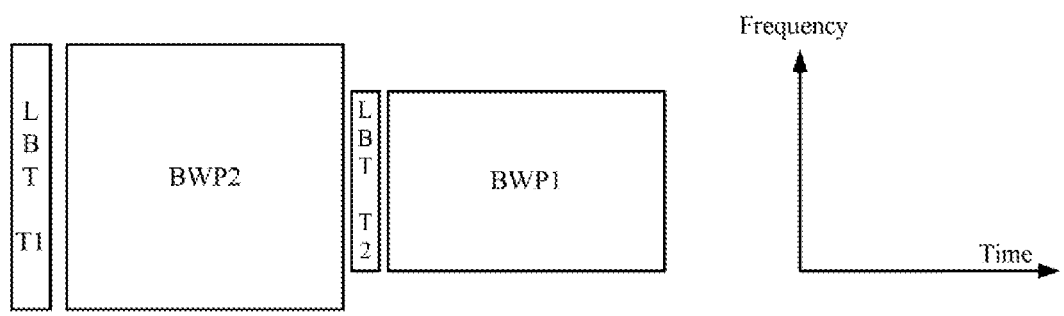
FIG. 12A and FIG. 12B are schematic diagrams each showing an example of a configuration of a LBT type on a BWP according to an embodiment of the present disclosure.
Figure 12B:
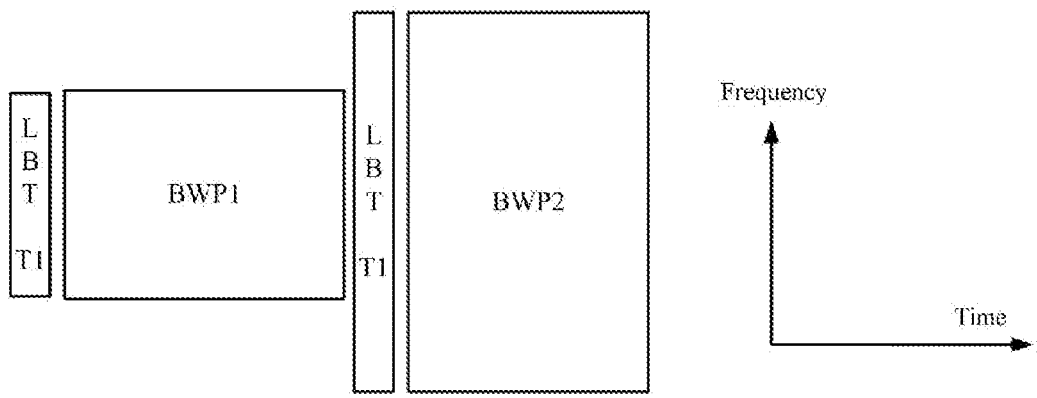

FIG. 12A and FIG. 12B are schematic diagrams showing an example of configuration of LBT type on a BWP according to an embodiment of the present disclosure.

As shown in FIG. 12A, it is assumed that the LBT type on the current BWP2 is a complex type, which is represented by T1 in FIG. 12A. In a case of switching from the BWP2 with a wide bandwidth to the BWP1 with a narrow bandwidth, since the BWP2 completely covers the BWP1, a simple type (which is represented as T2 in FIG. 12A) of LBT is performed on the BWP1 to increase the channel access speed. Alternatively, if the BWP2 does not completely cover the BWP1 but an overlapping degree between the BWP2 and the BWP1 is large, a simple LBT type may also be configured on the BWP2. This is due to utilization of the channel reservation by the previous channel-occupying device. That is, when another device detects that a channel is being used or the waiting time is extended to continuously detect for a period of time, channels on other bands of an unlicensed band are preferentially detected, such that an access priority of the currently detected channel is lowered. Therefore, there is a great possibility for the current device or the corresponding device to continuously use a subset or most of the current channel for transmission.

On the contrary, if the frequency domain range of the BWP after switching covers that of the BWP before switching and the overlapping degree therebetween is small, the increased channel uncertainty cannot be guaranteed. In this case, a LBT of a complex type is required to be performed to ensure fair occupation of channels. As shown in FIG. 12B, it is assumed that the LBT type on the current BWP1 is a complex type, which is represented by T1 in FIG. 12B. When switching from the BWP1 with a narrow bandwidth to the BWP2 with a wide bandwidth, since the BWP2 completely covers the BWP1 and the overlapping degree between the BWP1 and the BWP2 is small, in order to ensure fair occupation of the channel, the LBT of a complex type (T1) is still required to be performed before switching to the BWP2.

It should be noted that, the device on the base station side described above with reference to FIG. 1 to FIG. 12B may be implemented at a chip level, or may be implemented at a device level by including other peripheral components. For example, the device may also operate as the base station itself, and include a communication unit (which is optional and indicated by a dashed box) for performing a communication operation. For example, the communication unit may be configured to perform communication with the user equipment, communication with other base stations, and the like. Furthermore, the device may further include a memory for storing a component carrier configuration table and the above BWP configuration table, and the like.

Correspondingly to the example of the configuration on the base station side described above, an example of a configuration on a user equipment side in a wireless communication system according to an embodiment of the present disclosure is described below.

2. An Example of a Configuration on a User Equipment Side According to the Present Disclosure FIG. 13 is a block diagram showing an example of functional configuration of a device on a user equipment side in a wireless communication system according to an embodiment of the present disclosure.

Figure 13:
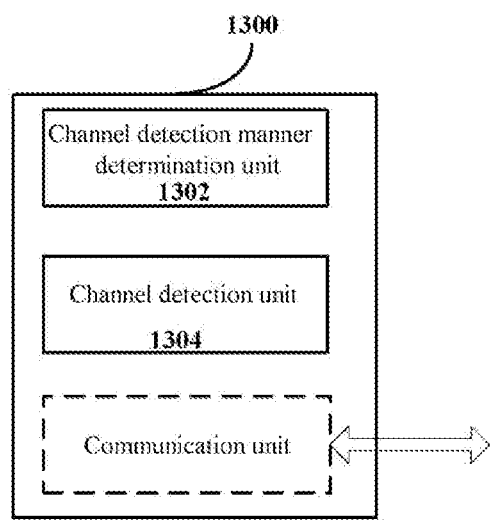
FIG. 13 is a block diagram showing an example of a functional configuration of a device on a user equipment side in a wireless communication system according to an embodiment of the present disclosure.

As shown in FIG. 13, a device 1300 according to the example may include a channel detection manner determination unit 1302 and a channel detection unit 1304. An example of a functional configuration of each unit is described in detail below.

The channel detection manner determination unit 1302 may be configured to determine a channel detection manner for an unlicensed band according to configuration information including the channel detection manner from a base station. The channel detection manner is determined by the base station based on at least a radio communication service type and/or a cell load condition, and the configuration information may be included in high layer signaling from the base station, for example.

The channel detection unit 1304 may be configured to perform channel detection on the unlicensed band based on the determined channel detection manner.

Preferably, the configuration information from the base station side further includes configuration information regarding the LBT type. The configuration information may be sent to the user equipment through high layer signaling or DCI, such that the channel detection unit 1304 may be further configured to perform channel detection on an unlicensed band according to configuration information regarding the LBT type from the base station.

Furthermore, preferably, in a case that the determined channel detection manner is BWP based channel detection or mixed channel detection, the channel detection unit 1304 may be further configured to perform channel detection of a corresponding LBT type on the configured uplink bandwidth part. For the specific configuration of the LBT type on the bandwidth part, reference may be made to the description of the corresponding position in the embodiment on the base station side, which is not described herein.

Corresponding to the example of the configuration on the base station side described above, an example of a configuration of a device on a user equipment side in a case that a channel detection manner includes BWP based channel detection is further described in detail below for a downlink communication scenario and an uplink communication scenario.

[2-1. Example in a Downlink Communication Scenario]

Figure 14:
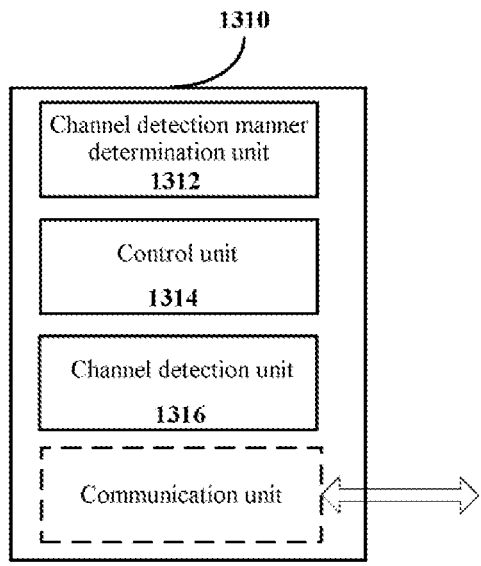
FIG. 14 is a block diagram of showing another example of a functional configuration of a device on a user equipment side in a wireless communication system according to an embodiment of the present disclosure.

FIG. 14 is a block diagram showing another example of a functional configuration of a device on a user equipment side in a wireless communication system according to an embodiment of the present disclosure.

As shown in FIG. 14, a device 1310 according to the example may include a channel detection manner determination unit 1312, a control unit 1314 and a channel detection unit 1316. An example of a functional configuration of each unit is described in detail below.

An example of a function configuration of the channel detection manner determination unit 1312 is substantially the same as that of the above channel detection manner determination unit 1302, which is not described herein.

The control unit 1314 may be configured to control a user equipment to perform detection on a full bandwidth to receive downlink control information from a base station.

In a case that the channel detection manner determination unit 1312 determines that the current channel detection manner is BWP based channel detection, if the channel detection is still performed on the entire component carrier bandwidth, power consumption of the user equipment is undoubtedly increased. Therefore, preferably, in order to reduce power consumption on the user equipment side, the base station may send initial bandwidth part configuration information including one or more downlink initial bandwidth parts to the user equipment, such that the control unit 1314 on the user equipment side may further control, based on the initial bandwidth part configuration information, the user equipment to receive downlink control information from the base station on one or more downlink initial bandwidth parts.

The downlink control information from the base station includes configuration information of an initial bandwidth part selected by the base station for downlink transmission among one or more downlink initial bandwidth parts, to indicate a frequency domain position for receiving downlink data to the user equipment. Therefore, preferably, the control unit 1314 may be further configured to determine a downlink initial bandwidth part selected by the base station for downlink transmission according to the received downlink control information, and control the user equipment to receive downlink data from the base station on the downlink initial bandwidth part.

Specifically, the user equipment may obtain the number indicating the configured BWP by decoding the received downlink control information, and determine information such as a center frequency point, a bandwidth, a configuration parameter and the like corresponding to the BWP, by searching a BWP configuration table stored on the user equipment side. Then, the user equipment may receive downlink data at a corresponding frequency domain position.

In the example of the downlink communication scenario, the user equipment needs to perform downlink reception feedback to notify the base station whether downlink data is successfully received.

As an example embodiment, the channel detection unit 1316 may be configured to perform channel detection on an uplink default bandwidth part, and the control unit 1314 may control the user equipment to send ACK/NACK feedback to the base station through the uplink default bandwidth part in a case that a result of the channel detection is idle. Furthermore, preferably, the uplink default BWP that is idle may also be used for the user equipment to send an uplink scheduling request (SR) to the base station in a case that uplink service transmission is to be performed.

Alternatively, as another example embodiment, when the base station sends the initial bandwidth part configuration information including one or more downlink initial bandwidth parts to the user equipment, the initial bandwidth part configuration information may also include one or more uplink bandwidth parts paired with the one or more initial downlink bandwidth parts. In this way, based on the received initial bandwidth part configuration information and downlink control information, the channel detection unit 1316 may be further configured to perform channel detection on an uplink bandwidth part paired with a downlink initial bandwidth part selected by the base station for downlink transmission among the one or more uplink bandwidth parts, and the control unit 1314 may control the user equipment to send ACK/NACK feedback to the base station through the uplink bandwidth part in a case that a result of the channel detection is idle. Furthermore, preferably, the idle uplink BWP may also be used by the user equipment to send an uplink scheduling request (SR) to the base station in a case that uplink service transmission is to be performed.

It should be understood that, the example of the configuration on the user equipment side in the downlink communication scenario described here with reference to FIG. 14 corresponds to the above example of the configuration on the base station side in the downlink communication scenario. Therefore, the contents which are not described in detail herein may be referred to the above corresponding description, which are not repeated herein.

[2-2. Example in an Uplink Communication Scenario]

Figure 15:
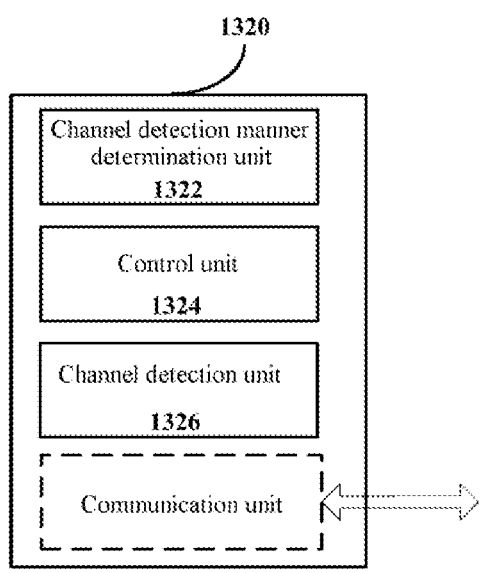
FIG. 15 is a block diagram showing yet another example of a functional configuration of a device on a user equipment side in a wireless communication system according to an embodiment of the present disclosure.

FIG. 15 is a block diagram showing yet another example of a functional configuration of a device on a user equipment side in a wireless communication system according to an embodiment of the present disclosure.

It should be noted that, in an uplink communication scenario, in a case that a user equipment needs to perform uplink service transmission, firstly, the user equipment needs to send an uplink scheduling request to a base station to request the base station to allocate a resource for uplink transmission. As described in the above example in the downlink communication scenario, the uplink scheduling request may be sent by an uplink default BWP which is detected to be idle or an uplink BWP paired with a downlink BWP which is used for the last downlink transmission, contents corresponding to which is not repeated in the example. The following description regarding the uplink communication scenario is made based on an assumption that an uplink scheduling request has been sent to the base station.

As shown in FIG. 15, a device 1320 according to the example may include a channel detection manner determination unit 1322, a control unit 1324 and a channel detection unit 1326. An example of functional configuration of each unit is described in detail below.

An example of function configuration of the channel detection manner determination unit 1322 is substantially the same as that of the above channel detection manner determination unit 1302, which is not described herein.

The control unit 1324 may be configured to control a user equipment to receive one or more pieces of uplink scheduling information from the base station, according to initial bandwidth part configuration information, including one or more uplink initial bandwidth parts, sent by the base station in response to an uplink scheduling request. After receiving the uplink scheduling request, the base station allocates one or more uplink initial bandwidth parts to the user equipment through high layer signaling (for example, RRC signaling, MAC CE, and the like), and sends uplink scheduling information (UL grant) regarding each uplink initial BWP on the corresponding downlink BWP which is detected to be idle. Preferably, the initial bandwidth part configuration information from the base station further includes one or more downlink bandwidth parts paired with the one or more uplink initial bandwidth parts, such that the control unit 1324 may be further configured to control the user equipment to receive one or more pieces of uplink scheduling information from the base station on one or more downlink bandwidth parts, rather than on the full bandwidth.

By decoding the received one or more pieces of uplink scheduling information and performing matching with the BWP configuration table stored on the user equipment side, the configuration information of the corresponding uplink initial BWP may be determined, which includes a center frequency point position, a bandwidth, a parameter configuration, time frequency resource allocation, and the like corresponding to each uplink initial BWP. Then, the channel detection unit 1326 may perform, according to the decoded information, channel detection on uplink initial bandwidth parts corresponding to respective pieces of uplink scheduling information simultaneously or in a time division manner. In other words, although the base station configures one or more uplink initial bandwidth parts to the user equipment through the high layer signaling, the user equipment performs channel detection only on a uplink initial bandwidth part for which corresponding uplink scheduling information is received.

The control unit 1324 may be further configured to control, according to a result of the channel detection and corresponding uplink scheduling information, the user equipment to perform uplink transmission to the base station on an uplink initial bandwidth part for which the result of the channel detection is idle and which has a high priority and/or has a simple LBT type.

Referring back to FIG. 5, it is assumed that the user equipment receives uplink scheduling information of the uplink initial bandwidth parts BWP1, BWP2, and BWP5, the channel detection unit 1326 on the user equipment side may perform channel detection on the above three BWPs simultaneously, or may preferentially detects the BWP1 and BWP5 which have high priorities and have no overlapping portion in a time division manner, and then detect BWP2 having a low priority in a case that both the BWP1 and the BWP5 having high priorities are unavailable. If results of the detections indicate that only one BWP is idle and available, uplink transmission is performed by directly accessing the idle BWP. In contrast, if results of the detections indicate that multiple BWPs are idle and available, a BWP which has a high priority and/or a simple LBT type may be preferentially selected based on the priority information and/or LBT type of each BWP notified by the base station.

It should be understood that, the example of the configuration on the user equipment side in the uplink communication scenario described here with reference to FIG. 15 corresponds to the above example of the configuration on the base station side in the uplink communication scenario. Therefore, the contents which are not described in detail herein may be referred to the above corresponding description, which are not repeated herein.

[2-3. Example in a BWP Switching Scenario]

Figure 16:
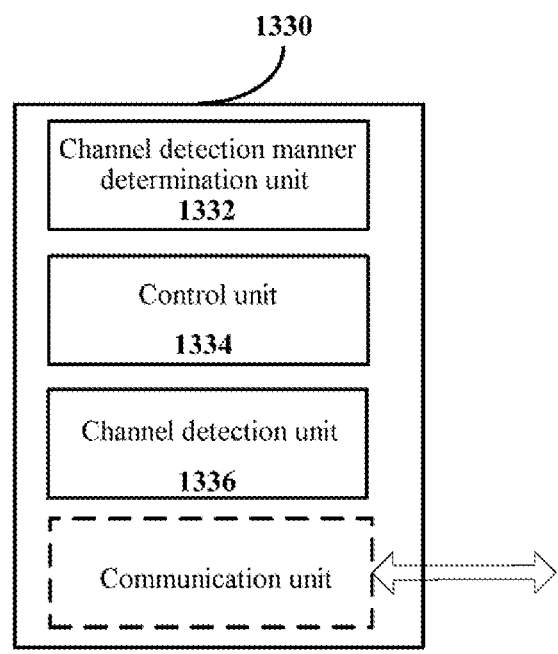
FIG. 16 is a block diagram showing still another example of a functional configuration of a device on a user equipment side in a wireless communication system according to an embodiment of the present disclosure.

FIG. 16 is a block diagram showing still another example of a functional configuration of a device on a user equipment side in a wireless communication system according to an embodiment of the present disclosure.

As shown in FIG. 16, a device 1330 according to the example may include a channel detection manner determination unit 1332, a control unit 1334 and a channel detection unit 1336. An example of a functional configuration of each unit is described in detail below.

An example of a function configuration of the channel detection manner determination unit 1332 is substantially the same as that of the above channel detection manner determination unit 1302, which is not described herein.

As described above, in order to avoid the need for additional scheduling signaling in a case of bandwidth part switching, an LBT timer may also be maintained on a user equipment side to trigger BWP switching on the user equipment side. Specifically, in a downlink communication or an uplink communication, if a busy state is always indicated by the channel detection by the channel detection unit 1336 on the user equipment side on the currently configured uplink bandwidth part for uplink feedback or uplink data transmission, and the channel cannot be accessed for communication, the LBT timer on the user equipment side may expire, to trigger switching to other uplink bandwidth parts for channel detection and access.

As an example, in a case that the LBT timer on the user equipment side expires, the control unit 1334 on the user equipment side may control the channel detection unit 1336 to perform channel detection on an uplink default bandwidth part, and control the user equipment to switch to the uplink default bandwidth part in a case that a result of the channel detection is idle. In this way, the user equipment may switch to the uplink default bandwidth part without additional scheduling by the base station, thus maintaining at least basic communication with the base station.

In another aspect, in the case that the originally scheduled uplink bandwidth part is used for transmission of a large amount of uplink data and causes the LBT timer to expire, an uplink default bandwidth part which is pre-configured by the equipment manufacturer may not meet the requirement. In order to solve this problem, in a case that the user equipment needs to perform uplink service transmission, the base station may start an uplink data reception timer once sending the corresponding uplink scheduling information to the user equipment. This timer is substantially synchronized with the LBT timer maintained by the user equipment. Therefore, in a case that the LBT timer on the user equipment side expires, the uplink data reception timer on the base station side also expires at the same time, to trigger the base station to allocate one or more uplink candidate bandwidth parts to the user equipment.

Therefore, preferably, as another example, the control unit 1334 may be further configured to control a user equipment to receive one or more pieces of uplink scheduling information from the base station according to configuration information including, one or more uplink candidate bandwidth parts, sent by the base station in a case that an uplink data reception timer expires.

After uplink candidate bandwidth parts to be detected are determined by decoding one or more pieces of uplink scheduling information from the base station, the channel detection unit 1336 may be further configured to perform channel detection on the uplink candidate bandwidth parts simultaneously or in a time division manner, and the control unit 1334 may be further configured to control, according to a result of the channel detection and corresponding uplink scheduling information, the user equipment to switch to an uplink candidate bandwidth part for which the result of the channel detection is idle and which has a high priority and/or has a simple LBT type, and transmit uplink data for the user equipment through the uplink candidate bandwidth part.

It should be noted that, a process described here, i.e. a process that in a case where BWP switching is needed, the base station configures one or more uplink candidate bandwidth parts for the user equipment to select therefrom an appropriate uplink candidate bandwidth for channel access, is similar to a process of configuring one or more uplink initial bandwidth parts described in the example in the uplink communication scenario, which is not repeated herein.

Furthermore, it should be understood that, the example of the configuration on the user equipment side in the BWP switching scenario described here with reference to FIG. 16 corresponds to the above example of the configuration on the base station side in the BWP switching scenario. Therefore, the contents which are not described in detail herein may be referred to the above corresponding description, which are not repeated herein.

It should be noted that, the device on the user equipment side described above with reference to FIG. 13 to FIG. 16 may be implemented at a chip level, or may be implemented at a device level by including other peripheral components. For example, the device may also operate as the user equipment itself, and include a communication unit (which is optional and indicated by a dashed box) for performing a communication operation. For example, the communication unit may be configured to perform communication with the base station, and the like. Furthermore, the device may further include a memory for storing a component carrier configuration table and the above BWP configuration table, and the like.

Furthermore, it should also be noted that each functional unit of the devices on the base station side and the user equipment side described above is only a logical module divided according to the specific functions that functional unit implements, and is not used to limit specific implementations. In actual implementation, the foregoing functional units and modules may be implemented as independent physical entities, or may be implemented by a single entity (for example, a processor (CPU or DSP, and the like), an integrated circuit, and the like).

Furthermore, it should also be noted that, although the device embodiments of the present disclosure have been described above with reference to block diagrams shown in the drawings, these embodiments are only examples rather than limitations. Those skilled in the art may modify the shown examples of functional configuration according to the principle of the present disclosure. For example, functional modules in various embodiments may be added, deleted, modified, combined and the like, and all of such modifications are considered to fall within the scope of the present disclosure.

In addition, it should also be noted that, although the examples of the device configuration in each communication scenario are separately described above for clarity of description, it does not mean that the embodiments are mutually exclusive. In actual implementation, various embodiments may be combined according to the principle of the present disclosure, and such a combination should be considered to fall within the scope of the present disclosure.

3. Method Embodiments According to the Present Disclosure

Correspondingly to the device embodiments described above, a method embodiment is further provided according to the present disclosure.

Figure 17:
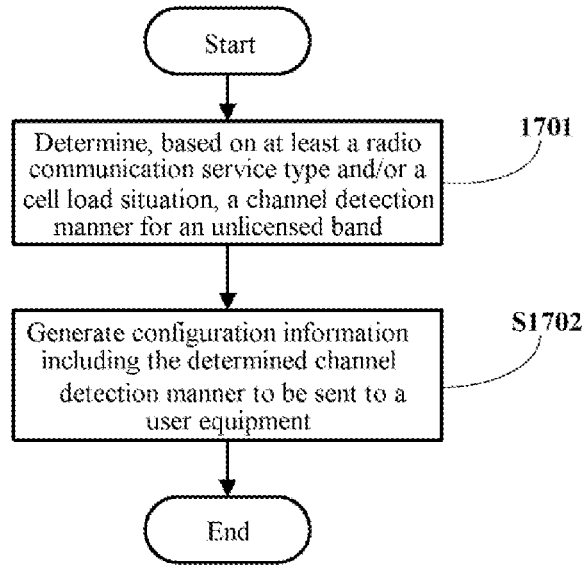
FIG. 17 is a flowchart showing a process example of a method on a base station side in a wireless communication system according to an embodiment of the present disclosure.

FIG. 17 is a flowchart showing a process example of a method on a base station side in a wireless communication system according to an embodiment of the present disclosure.

As shown in FIG. 17, the method according to the embodiment starts from step S1701. In step S1701, a channel detection manner for an unlicensed band is determined based on at least a radio communication service type and/or a cell load situation. The channel detection manner includes a channel detection manner performed on a large-bandwidth component carrier, a channel detection manner performed on a small-bandwidth bandwidth part, or a mixed channel detection manner combining the above two channel detection manners.

Next, the method proceeds to step S1702. In step S1702, configuration information including the determined channel detection manner is generated, and the configuration information is sent to a user equipment to indicate the channel detection manner to the user equipment.

An appropriate channel detection manner is determined based on at least the radio communication service type and/or the cell load condition, such that the bandwidth utilization efficiency can be effectively improved while reducing processing load of the base station and user equipment in the channel detection.

It should be understood that, the method embodiment described here corresponds to the above device embodiment on the base station side. Therefore, the contents which are not described in detail herein may be referred to the above corresponding description, which are not repeated herein.

Figure 18:
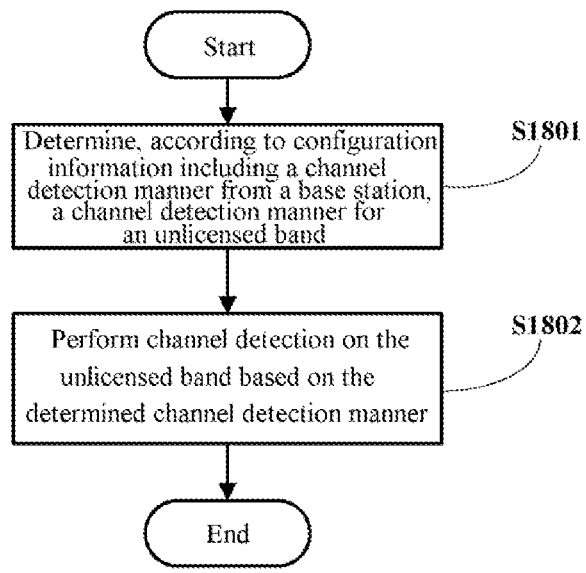
FIG. 18 is a flowchart showing a process example of a method on a user equipment side in a wireless communication system according to an embodiment of the present disclosure.

FIG. 18 is a flowchart showing a process example of a method on a user equipment side in a wireless communication system according to an embodiment of the present disclosure.

As shown in FIG. 18, a method according to the embodiment starts from step S1801. In step S1801, a channel detection manner for an unlicensed band is determined according to configuration information including a channel detection manner from a base station. The channel detection manner is determined by the base station based on at least a radio communication service type and/or a cell load condition.

Next, the method proceeds to step S1802. In step S1802, channel detection is performed on the unlicensed band based on the determined channel detection manner.

It should be understood that, the method embodiment described here corresponds to the above device embodiment on the user equipment side. Therefore, the contents which are not described in detail herein may be referred to the above corresponding description, which are not repeated herein.

It should be noted that, although the examples of the processes of the methods in the wireless communication system according to the embodiments of the present disclosure have been described, these embodiments are only examples rather than limitations. Those skilled in the art may modify the above embodiments according to the principle of the present disclosure. For example, the steps in the embodiments may be added, deleted and/or combined and the like, and all of such modifications fall within the scope of the present disclosure.

According to an embodiment of the present disclosure described above, in a case of performing channel detection on an unlicensed band in an NR system, a reasonable channel detection manner is determined based on an actual service type and/or a cell load condition, such that bandwidth allocation efficiency can be improved while reducing the channel detection complexity and processing load. In combination with operating characteristics on the unlicensed band, the case of allocating multiple downlink/uplink initial bandwidth parts to a base station and a user equipment to improve a channel access probability is also described in the above embodiment, and a problem of how to configure and schedule the bandwidth parts to maintain forward compatibility and scheduling flexibility is also discussed. Furthermore, the configuration of BWP switching and the configuration of the LBT type on the BWP are also discussed, which can maintain the original radio communication service increasing additional signaling overhead and simplify a flow of the conventional LBT to improve channel access speed.

It should be noted that, instead of the above advantages or in conjunction with the above advantages, other advantages and effects will also be apparent to those skilled in the art after reading the technical content of the present disclosure, which are not be enumerated here one by one.

It should be understood that, machine executable instructions in a storage medium and a program product according to the embodiments of the present disclosure may further be configured to perform the method corresponding to the above device embodiment. Therefore, for the contents not described in detail here, reference may be made to the previous corresponding description, which is not repeated here.

Accordingly, a storage medium on which the above program product storing machine executable instructions is carried is also included in the present disclosure. The storage medium includes but is not limited to floppy disc, optical disc, magneto-optical disk, memory card, memory stick, and the like.

Figure 19:
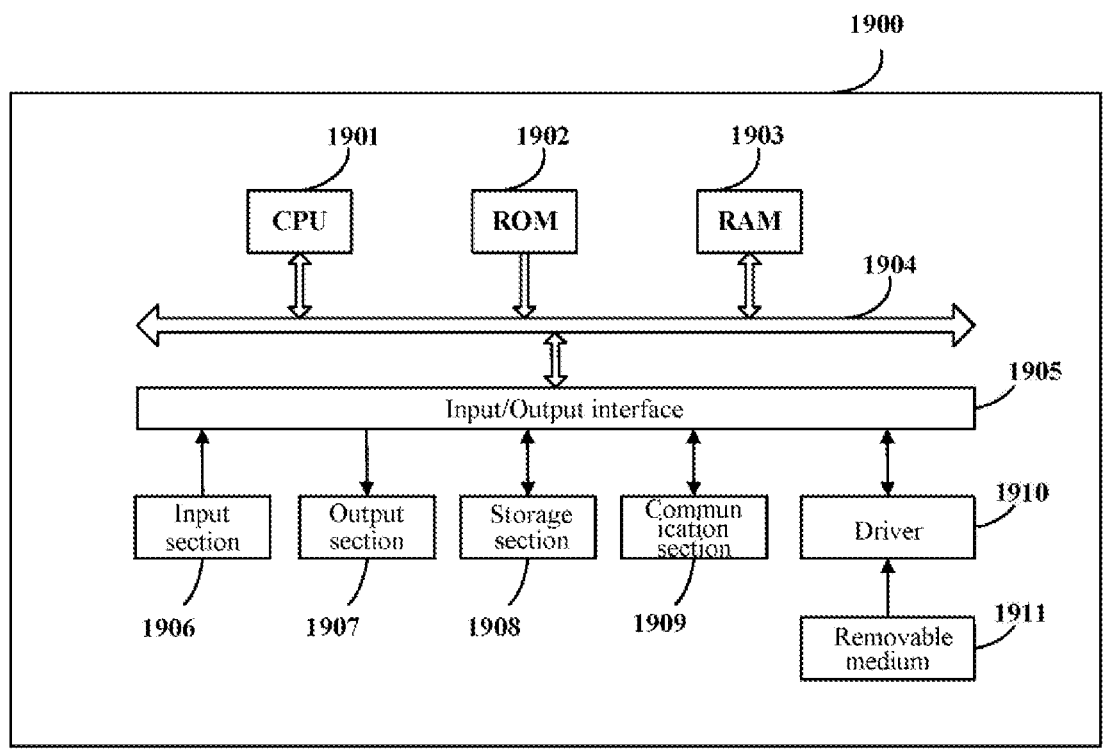
FIG. 19 is a block diagram showing an exemplary structure of a personal computer which may be used as an information processing device according to an embodiment of the present disclosure.

4. Computing Device for Implementing the Embodiments of the Device and the Method According to the Present Disclosure In addition, it is further to be noted that the above-described series of processing and devices may also be implemented by software and/or firmware. In the case of implementation in software and/or firmware, a program constituting the software is installed from a storage medium or a network to a computer with a dedicated hardware structure, for example, a general purpose personal computer 1900 shown in FIG. 19, which can perform various functions when various programs are installed thereon. FIG. 19 is a block diagram showing an exemplary structure of a personal computer which can be used as an information processing device according to an embodiment of the present disclosure.

In FIG. 19, a central processing unit (CPU) 1901 performs various processes according to the program stored in a read only memory (ROM) 1902 or the program loaded to a random access memory (RAM) 1903 from a storage section 1908. In the RAM 1903, the data required by the CPU 1901 to execute various processing is also stored as needed.

The CPU 1901, the ROM 1902 and the RAM 1903 are connected with each other via a bus 1904. An input/output interface 1905 is also connected to the bus 1904.

The following sections are connected to the input/output interface 1905: an input section 1906 including a keyboard, a mouse and the like, an output section 1907 including a display such as a cathode ray tube (CRT) and a liquid crystal display (LCD) and the like, a speaker, and the like; a storage section 1908 including a hard disk and the like, and a communication section 1909 including a network interface card such as a LAN card, a modem and the like. The communication section 1909 performs communication processing via a network such as the Internet.

A drive 1910 may also be connected to the input/output interface 1905 as needed. A removable medium 1911, such as a magnetic disk, an optical disk, an magneto optical disk, a semiconductor memory and the like, can be installed on the drive 1910 as needed so that a computer program fetched therefrom can be installed into the storage section 1908 as needed.

In a case that the above series of processes are performed by software, a program constituting the software is installed from a network, such as the Internet, or a storage medium, such as the removable medium 1911.

It is to be understood by those skilled in the art that the storage medium is not limited to the removable medium 1911 shown in FIG. 19 in which the program is stored and which is distributed separately from the device to provide a user equipment with the program. The removable medium 1911, for example, may include a magnetic disk (including a floppy disk (a registered trademark)), an optical disk (including compact disk-Read only memory (CD-ROM) and a digital versatile disk (DVD)), a magneto optical disk (including a mini disk (MD) (a registered trademark)) and a semiconductor memory. Alternatively, the storage medium may be a ROM 1902, a hard disk included in the storage section 1908, and the like, which has a program stored therein and is distributed to the user along with a device in which it is incorporated.

5. Application Examples of the Technology According to the Present Disclosure The technology according to the present disclosure may be applied to various products. For example, the base station mentioned in the present disclosure may be implemented as a gNodeB (gNB), an evolved node B (eNB) of any type such as a macro eNB and a small eNB, a transmission reception point (TRP) and the like. The small eNB may be an eNB such as a pico eNB, a micro eNB and a home (femto) eNB that covers a cell smaller than a macro cell. Alternatively, the base station may also be implemented as a base station of any other type, such as a NodeB and a base transceiver station (BTS). The base station may include a main body (that is also referred to as a base station device) configured to control wireless communication, and one or more remote radio heads (RRH) disposed in a different place from the main body. In addition, various types of terminals, which will be described below, may each operate as the base station by temporarily or semi-persistently executing a base station function.

For example, the UE mentioned in the present disclosure may be implemented as a mobile terminal (such as a smart phone, a tablet personal computer (PC), a notebook PC, a portable game terminal, a portable/dongle type mobile router, and a digital camera device), or an in-vehicle terminal (such as a car navigation device). The UE may also be implemented as a terminal (that is also referred to as a machine type communication (MTC) terminal) that performs machine-to-machine (M2M) communication. Furthermore, the UE may be a wireless communication module (such as an integrated circuit module including a single chip) mounted on each of the above terminals.

Application examples according to the present disclosure are described below with reference to FIGS. 20 to 23.

[5-1. Application Examples of a Base Station]

First Application Example

Figure 20:
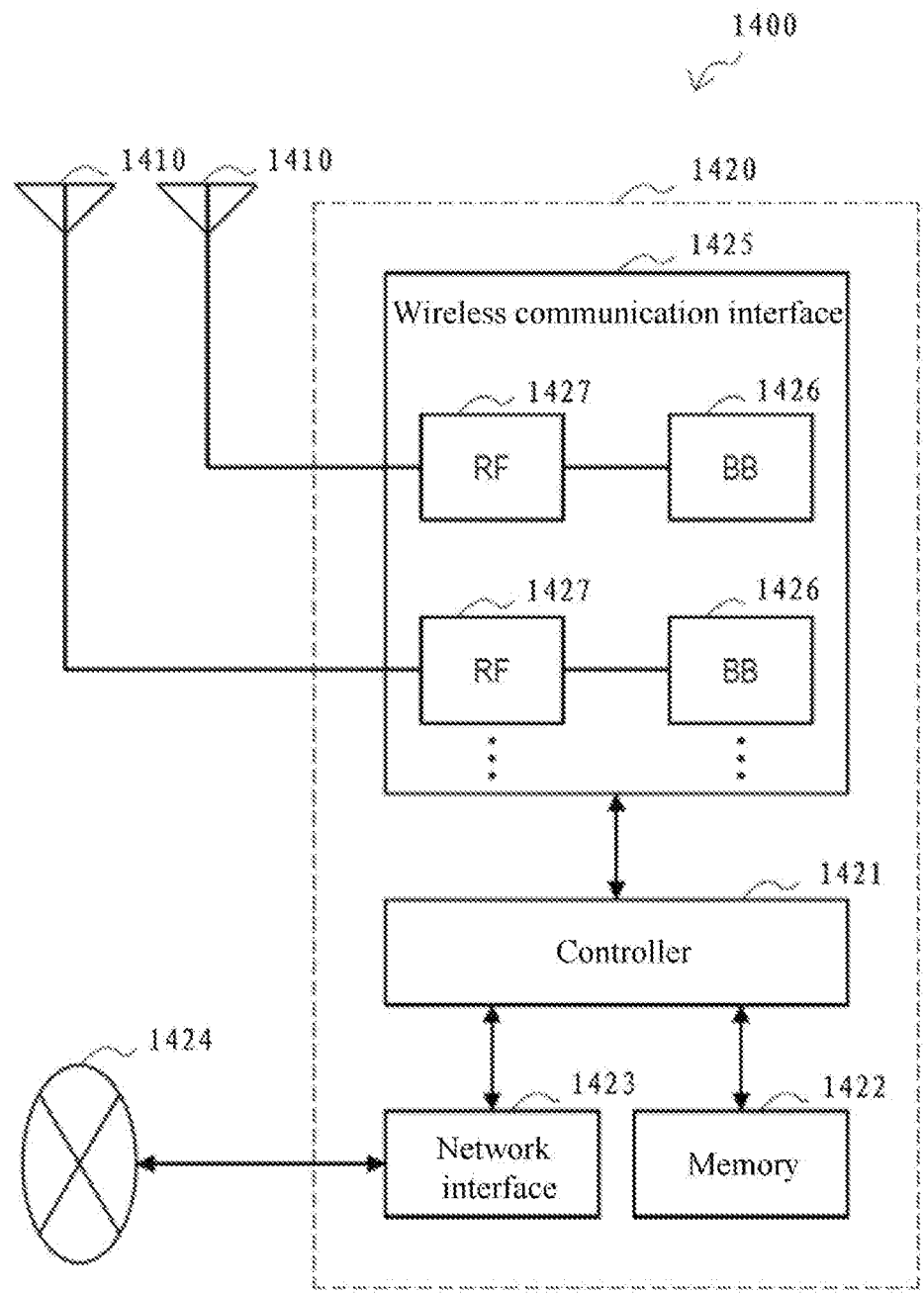
FIG. 20 is a block diagram showing a first example of a schematic configuration of an evolved node (eNB) to which the technology of the present disclosure may be applied.

FIG. 20 is a block diagram showing a first example of a schematic configuration of an eNB to which the technology of the present disclosure may be applied. An eNB 1400 includes one or more antennas 1410 and a base station device 1420. The base station device 1420 and each of one or more antennas 1410 may be connected with each other via an RF cable.

Each of the antennas 1410 includes a single antenna element or multiple antenna elements (such as multiple antenna elements included in a multiple input multiple output (MIMO) antenna), and is used for transmitting and receiving a radio signal by the base station device 1420. The eNB 1400 may include multiple antennas 1410, as shown in FIG. 20. For example, the multiple antennas 1410 may be compatible with multiple frequency bands used by the eNB 1400. Although FIG. 20 shows an example in which the eNB 1400 includes multiple antennas 1410, the eNB 1400 may also include a single antenna 1410.

The base station device 1420 includes a controller 1421, a memory 1422, a network interface 1423 and a wireless communication interface 1425.

The controller 1421 may be, for example, a CPU or a DSP, and operates various functions of a high layer of the base station device 1420. For example, the controller 1421 generates a data packet based on the data in signals processed by the wireless communication interface 1425, and transfers the generated packet via the network interface 1423. The controller 1421 may bundle data from multiple baseband processors to generate bundled packet, and transfer the generated bundled packet. The controller 1421 may have logical functions of performing control such as radio resource control, radio bearer control, mobility management, admission control, and scheduling. The control may be performed in conjunction with an adjacent eNB or a core network node. The memory 1422 includes an RAM and an ROM, and stores a program that is executed by the controller 1421, and various types of control data (such as a terminal list, transmission power data, and scheduling data).

The network interface 1423 is a communication interface for connecting the base station device 1420 to a core network 1424. The controller 1421 may communicate with a core network node or another eNB via the network interface 1423. In that case, the eNB 1400, and the core network node or the other eNB may be connected to each other through a logical interface (such as an S1 interface and an X2 interface). The network interface 1423 may also be a wired communication interface or a wireless communication interface for radio backhaul. If the network interface 1423 is a wireless communication interface, the network interface 1423 may use a frequency band for wireless communication higher than that used by the wireless communication interface 1425.

The wireless communication interface 1425 supports any cellular communication scheme (such as long term evolution (LTE) and LTE-advanced and new radio (NR)), and provides a wireless connection to a terminal positioned in a cell of the eNB 1400 via the antenna 1410. The wireless communication interface 1425 may typically include, for example, a base band (BB) processor 1426 and an RF circuit 1427. The BB processor 1426 may perform, for example, coding/decoding, modulation/demodulation and multiplexing/demultiplexing, and performs various types of signal processes of the layers (such as L1, media access control (MAC), radio link control (RLC) and packet data convergence protocol (PDCP)). Instead of the controller 1421, the BB processor 1426 may have a part or all of the above logical functions. The BB processor 1426 may be a memory that stores the communication control programs, or a module that includes a processor and related circuitry configured to execute the programs. In this way, the function of the BB processor 1426 may be changed when the programs are updated. The module may be a card or a blade which is inserted into a slot of the base station device 1420. Alternatively, the module may be a chip mounted on the card or the blade. In addition, the RF circuit 1427 may include, for example, a frequency mixer, a filter, and an amplifier, and transmits and receives a radio signal via the antenna 1410.

As shown in FIG. 20, the wireless communication interface 1425 may include multiple BB processors 1426. For example, the multiple BB processors 1426 may be compatible with multiple frequency bands used by the eNB 1400. As shown in FIG. 20, the wireless communication interface 1425 may include multiple RF circuits 1427. For example, the multiple RF circuits 1427 may be compatible with multiple antenna elements. Although FIG. 20 shows an example in which the wireless communication interface 1425 includes multiple BB processors 1426 and multiple RF circuits 1427, the wireless communication interface 1425 may also include a single BB processor 1426 or a single RF circuit 1427.

Second Application Example

Figure 21:
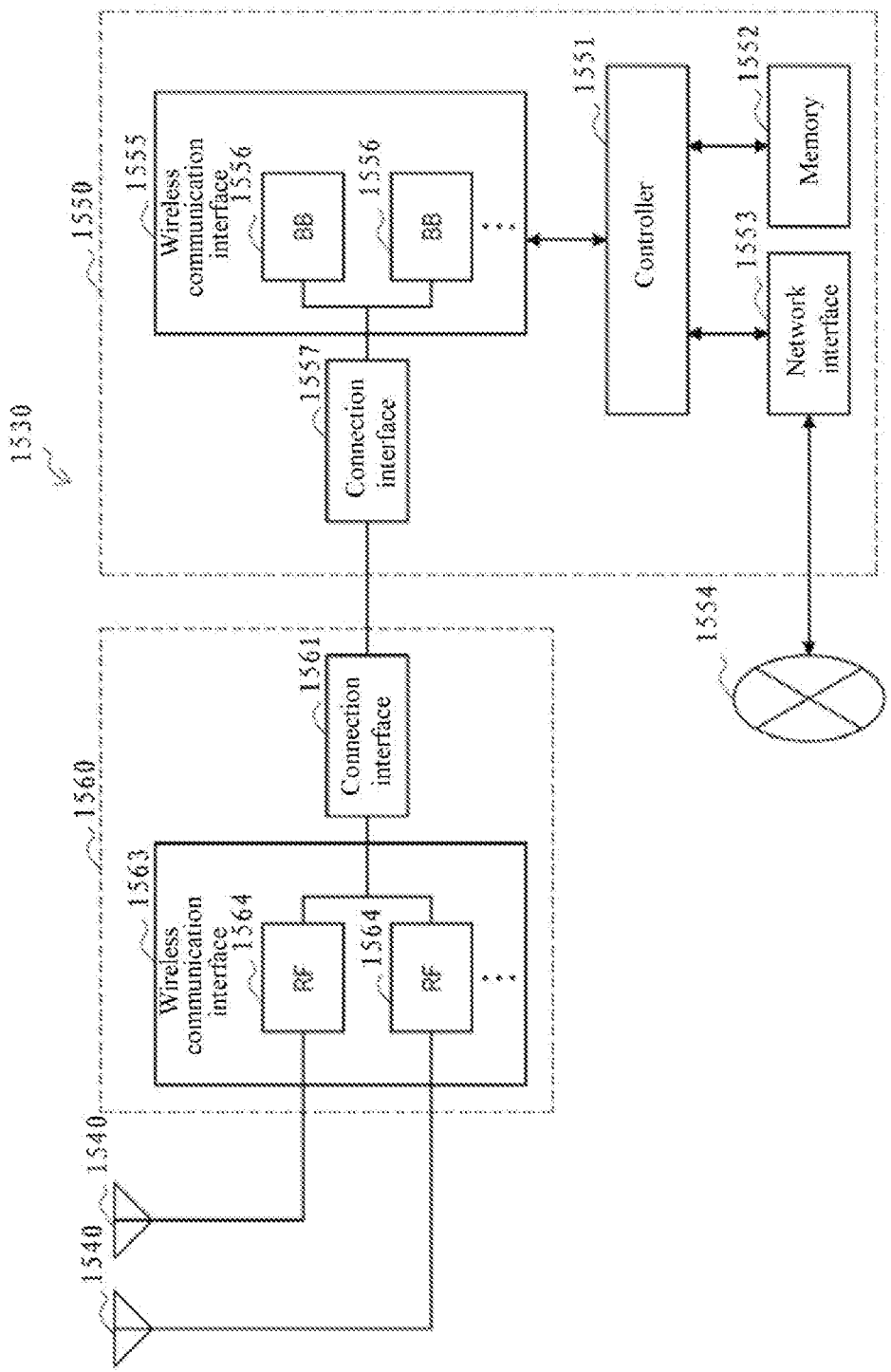
FIG. 21 is a block diagram showing a second example of a schematic configuration of an eNB to which the technology of the present disclosure may be applied.

FIG. 21 is a block diagram showing a second example of a schematic configuration of an eNB to which the technology of the present disclosure may be applied. An eNB 1530 includes one or more antennas 1540, a base station device 1550 and an RRH 1560. The RRH 1560 and each of one or more antennas 1540 may be connected with each other via an RF cable. The base station device 1550 and the RRH 1560 may be connected with each other via a high-speed line such as a fiber cable.

Each of the antennas 1540 includes a single antenna element or multiple antenna elements (such as multiple antenna elements included in a multiple input multiple output (MIMO) antenna), and is used for transmitting and receiving a radio signal by the RRH 1560. As shown in FIG. 21, the eNB 1530 may include multiple antennas 1540. For example, the multiple antennas 1540 may be compatible with multiple frequency bands used by the eNB 1530. Although FIG. 21 shows an example in which the eNB 1530 includes multiple antennas 1540, the eNB 1530 may also include a single antenna 1540.

The base station device 1550 includes a controller 1551, a memory 1552, a network interface 1553, a wireless communication interface 1555 and a connection interface 1557. The controller 1551, the memory 1552, and the network interface 1553 are the same as the controller 1421, the memory 1422, and the network interface 1423 described with reference to FIG. 20.

The wireless communication interface 1555 supports any cellular communication scheme (such as LTE, LTE-Advanced and NR) and provides wireless communication to a terminal located in a sector corresponding to the RRH 1560 via the RRH 1560 and the antenna 1540. The wireless communication interface 1555 may generally include, for example, a BB processor 1556. The BB processor 1556 is the same as the BB processor 1426 described with reference to FIG. 20, except the BB processor 1556 is connected to the RF circuit 1564 of the RRH 1560 via the connection interface 1557. As shown in FIG. 21, the wireless communication interface 1555 may include multiple BB processors 1556. For example, the multiple BB processors 1556 may be compatible with multiple frequency bands used by the eNB 1530. Although FIG. 21 shows an example in which the wireless communication interface 1555 includes multiple BB processors 1556, the wireless communication interface 1555 may also include a single BB processor 1556.

The connection interface 1557 is an interface for connecting the base station device 1550 (the wireless communication interface 1555) to the RRH 1560. The connection interface 1557 may also be a communication module for communication in the above high-speed line that connects the base station device 1550 (the wireless communication interface 1555) to the RRH 1560.

The RRH 1560 includes a connection interface 1561 and a wireless communication interface 1563.

The connection interface 1561 is an interface configured to connect the RRH 1560 (the wireless communication interface 1563) to the base station device 1550. The connection interface 1561 may also be a communication module for the communication in the above high-speed line.

The wireless communication interface 1563 transmits and receives a wireless signal via the antenna 1540. The wireless communication interface 1563 may typically include, for example, a RF circuit 1564. The RF circuit 1564 may include, for example, a frequency mixer, a filter and an amplifier, and transmits and receives the radio signal via the antenna 1540. As shown in FIG. 21, the wireless communication interface 1563 may include multiple RF circuits 1564. For example, the multiple RF circuits 1564 may support multiple antenna elements. Although FIG. 21 shows an example in which the wireless communication interface 1563 includes the multiple RF circuits 1564, the wireless communication interface 1563 may also include a single RF circuit 1564.

In the eNB 1400 shown in FIG. 20 and the eNB 1530 shown in FIG. 21, the communication unit of the above-described devices on the base station side may be implemented by the wireless communication interface 1425 and the wireless communication interface 1555 and/or the wireless communication interface 1563. At least a part of the functions of the above-described devices on the base station side may also be implemented by a controller 1421 and a controller 1551.

(5-2. Application Examples of a User Equipment)

First Application Example

Figure 22:
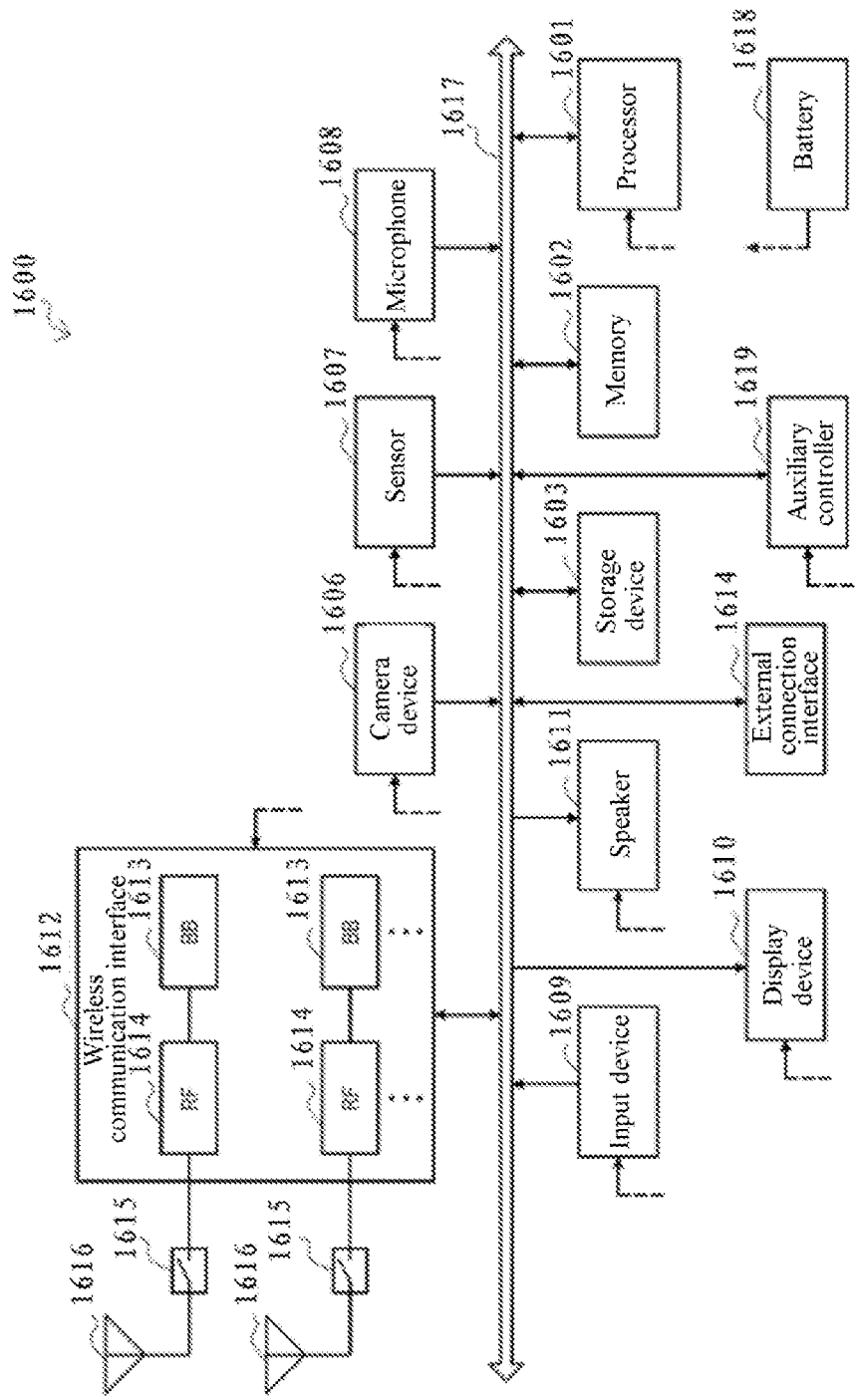
FIG. 22 is a block diagram showing an example of a schematic configuration of a smart phone to which the technology of the present disclosure may be applied.

FIG. 22 is a block diagram showing an example of a schematic configuration of a smart phone 1600 to which the technology of the present disclosure may be applied. The smart phone 1600 includes a processor 1601, a memory 1602, a storage device 1603, an external connection interface 1604, a camera device 1606, a sensor 1607, a microphone 1608, an input device 1609, a display device 1610, a speaker 1611, a wireless communication interface 1612, one or more antenna switches 1615, one or more antennas 1616, a bus 1617, a battery 1618 and an auxiliary controller 1619.

The processor 1601 may be, for example, a CPU or a system on chip (SoC), and controls functions of an application layer and another layer of the smart phone 1600. The memory 1602 includes an RAM and an ROM, and stores data, and a program that is executed by the processor 1601. The storage device 1603 may include a storage medium, such as a semiconductor memory and a hard disk. The external connection interface 1604 is an interface for connecting an external device (such as a memory card and a universal serial bus (USB) device) to the smart phone 1600.

The camera device 1606 includes an image sensor (such as a charge coupled device (CCD) and a complementary metal oxide semiconductor (CMOS)) and generates a captured image. The sensor 1607 may include a group of sensors, such as a measurement sensor, a gyroscope sensor, a geomagnetic sensor and an acceleration sensor. The microphone 1608 converts sound inputted into the smart phone 1600 into audio signals. The input device 1609 includes, for example, a touch sensor configured to detect touch onto a screen of the display device 1610, a keypad, a keyboard, a button or a switch, and receives an operation or information inputted by a user equipment. The display device 1610 includes a screen (such as a liquid crystal display (LCD) and an organic light emitting diode (OLED) display), and displays an output image of the smart phone 1600. The speaker 1611 converts audio signals outputted from the smart phone 1600 to sounds.

The wireless communication interface 1612 supports any cellular communication scheme (such as LTE, LTE-advanced and new radio NR) and performs wireless communication. The wireless communication interface 1612 may typically include, for example, a BB processor 1613 and an RF circuit 1614. The BB processor 1613 may, for example, perform encoding/decoding, modulating/demodulating and multiplexing/de-multiplexing, and perform various types of signal processing for wireless communication. In addition, the RF circuit 1614 may include, for example, a frequency mixer, a filter and an amplifier, and transmit and receive a radio signal via the antenna 1616. The wireless communication interface 1612 may be one chip module on which the BB processor 1613 and the RF circuit 1614 are integrated. The wireless communication interface 1612 may include multiple BB processors 1613 and multiple RF circuits 1614, as shown in FIG. 22. Although FIG. 22 shows an example in which the wireless communication interface 1612 includes the multiple BB processors 1613 and the multiple RF circuits 1614, the wireless communication interface 1612 may also include a single BB processor 1613 or a single RF circuit 1614.

Furthermore, in addition to a cellular communication scheme, the wireless communication interface 1612 may also support a wireless communication scheme of another type, such as a short-distance wireless communication scheme, a near field communication scheme, and a wireless local area network (LAN) scheme. In this case, the wireless communication interface 1612 may include the BB processor 1613 and the RF circuit 1614 for each wireless communication scheme.

Each of the antenna switches 1615 switches a connection destination of the antennas 1616 among multiple circuits (such as circuits for different wireless communication schemes) included in the wireless communication interface 1612.

Each of the antennas 1616 includes a single antenna element or multiple antenna elements (such as multiple antenna elements included in an MIMO antenna), and is used for transmitting and receiving a radio signal by the wireless communication interface 1612. The smart phone 1600 may include multiple antennas 1616, as shown in FIG. 22. Although FIG. 22 shows an example in which the smart phone 1600 includes multiple antennas 1616, the smart phone 1600 may also include a single antenna 1616.

Furthermore, the smart phone 1600 may include an antenna 1616 for each wireless communication scheme. In this case, the antenna switches 1615 may be omitted from the configuration of the smart phone 1600.

The bus 1617 connects the processor 1601, the memory 1602, the storage device 1603, the external connection interface 1604, the camera device 1606, the sensor 1607, the microphone 1608, the input device 1609, the display device 1610, the speaker 1611, the wireless communication interface 1612, and the auxiliary controller 1619 to each other. The battery 1618 supplies power to blocks of the smart phone 1600 shown in FIG. 22 via feeder lines, which are partially shown as dashed lines in the figure. The auxiliary controller 1619 operates a minimum necessary function of the smart phone 1600, for example, in a sleep mode.

In the smart phone 1600 shown in FIG. 22, the communication unit of the above-described device on the user equipment side may be implemented by the wireless communication interface 1612. At least a part of the functions of the above-described device on the user equipment side may also be implemented by the processor 1601 or the auxiliary controller 1619.

Second Application Example

Figure 23:
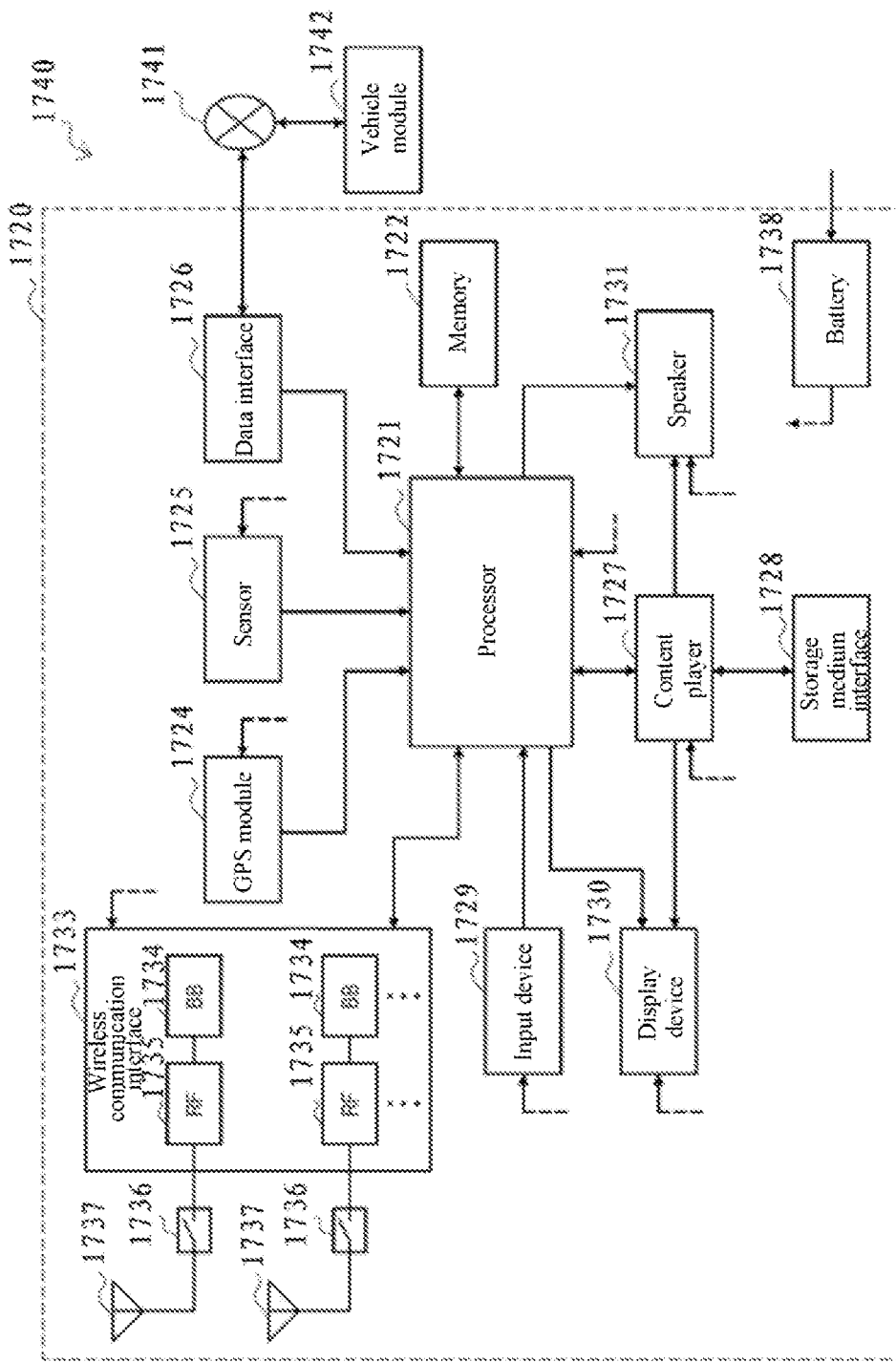
FIG. 23 is a block diagram showing an example of a schematic configuration of a car navigation device to which the technology of the present disclosure may be applied.

FIG. 23 is a block diagram showing an example of a schematic configuration of a car navigation device 1720 to which the technology of the present disclosure may be applied. The car navigation device 1720 includes a processor 1721, a memory 1722, a global positioning system (GPS) module 1724, a sensor 1725, a data interface 1726, a content player 1727, a storage medium interface 1728, an input device 1729, a display device 1730, a speaker 1731, a wireless communication interface 1733, one or more antenna switches 1736, one or more antennas 1737 and a battery 1738.

The processor 1721 may be, for example, a CPU or a SoC, and control the navigation function and other functions of the car navigation device 1720. The memory 1722 includes an RAM and an ROM, and stores data, and a program that is executed by the processor 1721.

The GPS module 1724 determines a position (such as a latitude, a longitude and a height) of the car navigation device 1720 by using a GPS signal received from a GPS satellite. The sensor 1725 may include a group of sensors such as a gyroscope sensor, a geomagnetic sensor and an air pressure sensor. The data interface 1726 is connected to, for example, an in-vehicle network 1741 via a terminal that is not shown, and acquires data generated by the vehicle (such as vehicle speed data).

The content player 1727 reproduces contents stored in a storage medium (such as a CD and a DVD) which is inserted into the storage medium interface 1728. The input device 1729 includes, for example, a touch sensor configured to detect touch onto a screen of the display device 1730, a button or a switch, and receives an operation or information inputted by a user equipment. The display device 1730 includes a screen such as a LCD or an OLED display, and displays an image of the navigation function or content that is reproduced. The speaker 1731 outputs a sound with a navigation function or the reproduced content.

The wireless communication interface 1733 supports any cellular communication solution (such as LTE, LTE-advanced and new radio NR) and performs wireless communication. The wireless communication interface 1733 may typically include, for example, a BB processor 1734 and an RF circuit 1735. The BB processor 1734 may perform, for example, coding/decoding, modulation/demodulation and multiplexing/de-multiplexing, and perform various types of signal processing for wireless communication. In addition, the RF circuit 1735 may include, for example, a frequency mixer, a filter and an amplifier, and transmit and receive a radio signal via the antenna 1737. The wireless communication interface 1733 may be a chip module on which the BB processor 1734 and the RF circuit 1735 are integrated. The wireless communication interface 1733 may include multiple BB processors 1734 and multiple RF circuits 1735, as shown in FIG. 23. Although FIG. 23 shows an example in which the wireless communication interface 1733 includes the multiple BB processors 1734 and the multiple RF circuits 1735, the wireless communication interface 1733 may also include a single BB processor 1734 or a single RF circuit 1735.

Furthermore, in addition to the cellular communication scheme, the wireless communication interface 1733 may also support a wireless communication scheme of another type, such as a short-distance wireless communication scheme, a near field communication scheme and a wireless LAN scheme. In this case, for each wireless communication scheme, the wireless communication interface 1733 may include the BB processor 1734 and the RF circuit 1735.

Each of the antenna switches 1736 switches connection destinations of the antenna 1737 among multiple circuits (such as circuits for different wireless communication schemes) included in the wireless communication interface 1733.

Each of the antennas 1737 includes one or more antenna elements (such as multiple antenna elements included in a MIMO antenna) and is used for transmitting and receiving a radio signal by the wireless communication interface 1733. As shown in FIG. 23, the car navigation device 1720 may include multiple antennas 1737. Although FIG. 23 shows an example in which the car navigation device 1720 includes multiple antennas 1737, the car navigation device 1720 may also include a single antenna 1737.

Furthermore, the car navigation device 1720 may include the antenna 1737 for each wireless communication scheme. In this case, the antenna switch 1736 may be omitted from the configuration of the car navigation device 1720.

The battery 1738 supplies power for blocks of the car navigation device 1720 shown in FIG. 23 via feeder lines, which are partially shown as dotted lines in the figure. The battery 1738 accumulates the power supplied from the vehicle.

In the car navigation device 1720 shown in FIG. 23, the communication unit of the above-described device on the user equipment side may be implemented by the wireless communication interface 1733. At least a part of the functions of the above-described device on the user equipment side may also be implemented by the processor 1721.

The technology of the present disclosure may be implemented as an in-vehicle system (or a vehicle) 1740 including one or more of the blocks of the car navigation device 1720, an in-vehicle network 1741 and a vehicle module 1742. The vehicle module 1742 generates vehicle data (such as a vehicle speed, an engine speed, and fault information), and outputs the generated data to the in-vehicle network 1741.

Preferred embodiments of the present disclosure have been described above with reference to the drawings, but the present disclosure is not limited to the above examples of course. Those skilled in the art can make various changes and modifications within the scope of the appended claims, and it is to be understood that such changes and modifications naturally fall within the technical scope of the present disclosure.

For example, multiple functions of one unit in the above embodiment may be implemented with separate devices. Alternatively, multiple functions implemented by multiple units in the above embodiments may be implemented by separated devices respectively. In addition, one of the above functions may be implemented by multiple units. Needless to say, such configuration is included in the technical scope of the present disclosure.

In the specification, steps described in the flowchart include not only the processing performed chronologically, but also the processing performed in parallel or individually rather than chronologically. Furthermore, even in the steps processed chronically, without saying, the order can be appropriately changed.

Although the present disclosure and advantages of the present disclosure have been described in detail, it should be understood that various changes, substitutions and alterations may be made without departing from the spirit and scope of the present disclosure as defined by the appended claims. Furthermore, the term "include", "comprise" or any variant thereof in the embodiments of the present disclosure is intended to encompass nonexclusive inclusion, so that a process, a method, an article or a device including a series of elements includes not only those elements but also other elements which have been not listed definitely or elements inherent to the process, the method, the article or the device. The elements defined by the statement "comprising one . . . " do not exclude that there are other identical elements in the process, method, article, or device that includes the elements, if not specifically limited otherwise.

The invention claimed is:

1. A device in a wireless communication system, the device comprising processing circuitry configured to:
   determine, based on at least a radio communication service type and/or a cell load condition, a channel detection manner for an unlicensed band; and
   generate configuration information comprising the channel detection manner, the configuration information being sent to a user equipment to indicate the channel detection manner to the user equipment,
   wherein the channel detection manner comprises component carrier based channel detection and bandwidth part based channel detection, a bandwidth part being a part obtained by dividing a component carrier and having a smaller bandwidth than the component carrier, and
   wherein the processing circuitry is further configured to:
   in a case that a listen-before-talk (LBT) timer on a base station side expires, perform channel detection on a downlink default bandwidth part, and switch, in a case that a result of the channel detection is idle, to the downlink default bandwidth part from a current downlink bandwidth part.

2. The device according to claim 1, wherein the processing circuitry is further configured to determine the channel detection manner to be the component carrier based channel detection in a case that the radio communication service type requires a large bandwidth and/or a cell load is small; and to determine the channel detection manner to be the bandwidth part based channel detection in a case that the radio communication service type requires a small bandwidth and/or the cell load is large; or
   wherein the channel detection manner further comprises mixed channel detection combining the component carrier based channel detection with the bandwidth part based channel detection.

3. The device according to claim 1, wherein the processing circuitry is further configured to:
   perform, in a case that the channel detection manner is the bandwidth part based channel detection, channel detection on one or more downlink initial bandwidth parts;
   select, based on a result of the channel detection, a downlink initial bandwidth part, for which the result of the channel detection is idle and which has the high priority and/or has the simple LBT type, from the one or more downlink initial bandwidth parts as a bandwidth part for downlink transmission; and
   generate configuration information comprising the selected downlink initial bandwidth part to be sent to the user equipment.

4. The device according to claim 3, wherein the processing circuitry is further configured to:
   generate initial bandwidth part configuration information comprising the one or more downlink initial bandwidth parts to be sent to the user equipment.

5. The device according to claim 4, wherein the initial bandwidth part configuration information further comprises one or more uplink bandwidth parts paired with the one or more downlink initial bandwidth parts.

6. The device according to claim 1, wherein the processing circuitry is further configured to:
   generate, in response to an uplink scheduling request from the user equipment, initial bandwidth part configuration information comprising one or more uplink initial bandwidth parts to be sent to the user equipment, in a case that the channel detection manner is the bandwidth part based channel detection;
   generate one or more pieces of uplink scheduling information corresponding to the one or more uplink initial bandwidth parts; and
   perform channel detection on one or more downlink bandwidth parts paired with the one or more uplink initial bandwidth parts, so as to send the generated one or more pieces of uplink scheduling information to the user equipment through one or more downlink bandwidth parts for each of which a result of the channel detection is idle.

7. The device according to claim 6, wherein the initial bandwidth part configuration information further comprises one or more downlink bandwidth parts paired with the one or more uplink initial bandwidth parts.

8. The device according to claim 7, wherein the processing circuitry is further configured to perform channel detection on the downlink default bandwidth part or a downlink bandwidth part paired with an uplink initial bandwidth part used by the user equipment for uplink transmission among the one or more downlink bandwidth parts, and to perform, in the case that the result of the channel detection is idle, uplink reception feedback through the downlink default bandwidth part or the downlink bandwidth part paired with the uplink initial bandwidth part used by the user equipment for uplink transmission.

9. The device according to claim 1, wherein the processing circuitry is further configured to:
   generate, in a case that an uplink data reception timer on a base station side expires, configuration information comprising one or more uplink candidate bandwidth parts to be sent to the user equipment;
   generate one or more pieces of uplink scheduling information corresponding to the one or more uplink candidate bandwidth parts; and
   perform channel detection on one or more downlink bandwidth parts paired with the one or more uplink candidate bandwidth parts, so as to send the generated one or more pieces of uplink scheduling information to the user equipment through one or more downlink bandwidth parts for each of which a result of the channel detection is idle; or
   determine, when a base station or the user equipment switches between different bandwidth parts, a LBT type on a bandwidth part after switching for the base station or the user equipment based on a relationship between frequency domain ranges of a bandwidth part before switching and the bandwidth part after switching.

10. A device in a wireless communication system, the device comprising processing circuitry configured to:
    determine a channel detection manner for an unlicensed band according to configuration information comprising the channel detection manner from a base station; and
    perform channel detection on the unlicensed band based on the determined channel detection manner,
    wherein the channel detection manner is determined by the base station based on at least a radio communication service type and/or a cell load condition,
    wherein the channel detection manner comprises component carrier based channel detection and bandwidth part based channel detection, a bandwidth part being a part obtained by dividing a component carrier and having a smaller bandwidth than the component carrier, and
    wherein the processing circuitry is further configured to:
    in a case that a listen-before-talk (LBT) timer on a user equipment side expires, perform channel detection on an uplink default bandwidth part, and control the user equipment to switch to the uplink default bandwidth part from a current uplink bandwidth part if a result of the channel detection is idle.

11. The device according to claim 10, wherein the processing circuitry is further configured to:
    control, according to initial bandwidth part configuration information comprising one or more downlink initial bandwidth parts from the base station, a user equipment to receive downlink control information from the base station on the one or more downlink initial bandwidth parts.

12. The device according to claim 11, wherein the processing circuitry is further configured to:
    determine a downlink initial bandwidth part selected by the base station for downlink transmission according to the received downlink control information, and
    control the user equipment to receive downlink data from the base station on the downlink initial bandwidth part.

13. The device according to claim 12, wherein the processing circuitry is further configured to:
    perform channel detection on the uplink default bandwidth part or a downlink bandwidth part paired with an uplink initial bandwidth part used by the user equipment for uplink transmission among the one or more downlink bandwidth parts, and
    perform downlink reception feedback and/or make an uplink scheduling request to the base station through the uplink default bandwidth part in the case that the result of the channel detection is idle.

14. The device according to claim 12, wherein the initial bandwidth part configuration information further comprises one or more uplink bandwidth parts paired with the one or more downlink initial bandwidth parts, and
    wherein the processing circuitry is further configured to:
    perform channel detection on an uplink bandwidth part paired with the downlink initial bandwidth part selected by the base station for downlink transmission among the one or more uplink bandwidth parts, and
    perform downlink reception feedback and/or make an uplink scheduling request to the base station through the uplink bandwidth part in the case that the result of the channel detection is idle.

15. The device according to claim 10, wherein the processing circuitry is further configured to:
    control, according to initial bandwidth part configuration information, comprising one or more uplink initial bandwidth parts, sent by the base station in response to an uplink scheduling request, a user equipment to receive one or more pieces of uplink scheduling information from the base station;
    perform, according to the received one or more pieces of uplink scheduling information, channel detection on uplink initial bandwidth parts corresponding to respective pieces of uplink scheduling information simultaneously or in a time division manner, and
    control, according to a result of the channel detection and corresponding uplink scheduling information, the user equipment to perform uplink transmission to the base station on an uplink initial bandwidth part for which the result of the channel detection is idle and which has the high priority and/or has the simple LBT type.

16. The device according to claim 10, wherein the initial bandwidth part configuration information further comprises one or more downlink bandwidth parts paired with the one or more uplink initial bandwidth parts, and the processing circuitry is further configured to control the user equipment to receive the one or more pieces of uplink scheduling information from the base station on the one or more downlink bandwidth parts.

17. The device according to claim 10, wherein the processing circuitry is further configured to:
control a user equipment to receive one or more pieces of uplink scheduling information from the base station according to configuration information comprising, one or more uplink candidate bandwidth parts, sent by the base station in a case that an uplink data reception timer expires;
perform, according to the received one or more pieces of uplink scheduling information, channel detection on uplink candidate bandwidth parts corresponding to respective pieces of uplink scheduling information simultaneously or in a time division manner; and
control, according to a result of the channel detection and corresponding uplink scheduling information, the user equipment to switch to an uplink candidate bandwidth part for which the result of the channel detection is idle and which has a high priority and/or has a simple LBT type; or
perform channel detection on a corresponding uplink bandwidth part according to configuration information regarding a LBT type from the base station.

18. A method in a wireless communication system, the method comprising:
determining a channel detection manner for an unlicensed band according to configuration information comprising the channel detection manner from a base station; and
performing channel detection on the unlicensed band based on the determined channel detection manner,
wherein the channel detection manner is determined by the base station based on at least a radio communication service type and/or a cell load condition,
wherein the channel detection manner comprises component carrier based channel detection and bandwidth part based channel detection, a bandwidth part being a part obtained by dividing a component carrier and having a smaller bandwidth than the component carrier, and
wherein the method further comprises:
in a case that a listen-before-talk (LBT) timer on a base station side expires, performing channel detection on a downlink default bandwidth part, and switching, in a case that a result of the channel detection is idle, to the downlink default bandwidth part from a current downlink bandwidth part.

* * * * *